(12) United States Patent
Hayasaka et al.

(10) Patent No.: US 9,128,616 B2
(45) Date of Patent: Sep. 8, 2015

(54) STORAGE DEVICE TO BACKUP CONTENT BASED ON A DEDUPLICATION SYSTEM

(75) Inventors: Mitsuo Hayasaka, Tokyo (JP); Koji Yamasaki, Yokohama (JP); Naomitsu Tashiro, Oi (JP)

(73) Assignees: HITACHI, LTD., Tokyo (JP); HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 325 days.

(21) Appl. No.: 13/508,583

(22) PCT Filed: Apr. 13, 2012

(86) PCT No.: PCT/JP2012/002589
§ 371 (c)(1),
(2), (4) Date: May 8, 2012

(87) PCT Pub. No.: WO2013/153584
PCT Pub. Date: Oct. 17, 2013

(65) Prior Publication Data
US 2013/0275696 A1    Oct. 17, 2013

(51) Int. Cl.
*G06F 12/00* (2006.01)
*G06F 13/00* (2006.01)
*G06F 3/06* (2006.01)
*G06F 11/14* (2006.01)

(52) U.S. Cl.
CPC .............. *G06F 3/0608* (2013.01); *G06F 3/061* (2013.01); *G06F 3/067* (2013.01); *G06F 3/0641* (2013.01); *G06F 3/0671* (2013.01); *G06F 11/1453* (2013.01); *G06F 11/1469* (2013.01)

(58) Field of Classification Search
CPC ............................ G06F 3/0641; G06F 11/1453
See application file for complete search history.

(56) References Cited

U.S. PATENT DOCUMENTS

| 6,928,526 | B1 | 8/2005 | Zhu et al. | |
|---|---|---|---|---|
| 8,190,836 | B1 * | 5/2012 | Zheng et al. | 711/162 |
| 8,627,026 | B2 * | 1/2014 | Domyo et al. | 711/162 |
| 2010/0125553 | A1 * | 5/2010 | Huang et al. | 707/661 |
| 2011/0161291 | A1 | 6/2011 | Taleck et al. | |

(Continued)

OTHER PUBLICATIONS

Andrew S. Tanenbaum and Albert S. Woodhull, Operating Systems: Design and Implementation, Third Edition, Prentice Hall, 2006. 4.4.7. Simulating LRU in Software.

(Continued)

*Primary Examiner* — Sean D Rossiter
(74) *Attorney, Agent, or Firm* — Volpe and Koenig, P.C.

(57) ABSTRACT

Chunks that commonly occur in each content type are aggregated in a first container. To be more specific, a storage device used for content backup is configured with: (1) a memory device that provides a memory region for one or a plurality of first containers used to store first chunks that commonly occur in each content type among chunks extracted from the contents of writing targets, and for one or a plurality of second containers used to store other chunks than the first chunks; and (2) a backup unit that decides whether each of the chunks extracted from the contents of the writing targets is a first duplication chunk duplicating a chunk stored in the first container, and further decides, for only a chunk that is decided not to be the first duplication chunk, whether each of the chunks is a second duplication chunk duplicating a chunk stored in the second container, and then stores only a chunk that is decided not to be the second duplication chunk in the second container.

8 Claims, 15 Drawing Sheets

(56) References Cited

U.S. PATENT DOCUMENTS

| | | | |
|---|---|---|---|
| 2011/0202709 A1* | 8/2011 | Rychlik | 711/103 |
| 2012/0084524 A1* | 4/2012 | Gokhale et al. | 711/162 |
| 2012/0233417 A1* | 9/2012 | Kalach et al. | 711/162 |
| 2012/0278286 A1* | 11/2012 | Awazu et al. | 707/649 |
| 2013/0046944 A1* | 2/2013 | Domyo et al. | 711/162 |
| 2013/0054919 A1* | 2/2013 | Auvenshine et al. | 711/165 |
| 2013/0086006 A1* | 4/2013 | Colgrove et al. | 707/692 |
| 2014/0122818 A1* | 5/2014 | Hayasaka et al. | 711/162 |

OTHER PUBLICATIONS

Donald E. Knuth, The Art of Computer Programming, vol. 3/Sorting and Searching, Addison-Wesley Publishing Company, 1973. 6.4. Hashing, 6.5. Retrieval on Secondary Keys.

Thomas H. Cormen, Charles E. Leiserson, Ronald L. Rivest, Clifford Stein, Introduction to Algorithms, Second Edition, MIT press, 2001. 32.2 The Rabin-Karp algorithm.

* cited by examiner

Fig. 4B

| ContentID 361 | FP 362 | ContainerID 364 | Content offset 366 | Chunk length 368 | |
|---|---|---|---|---|---|
| $f_1$ | $FP_a$ | $C_f$ | offset a | length a | |
| $f_1$ | $FP_f$ | $C_c$ | offset f | length f | — $S_{f1}$ (202) |
| $f_2$ | $FP_b$ | $C_g$ | offset b | length b | |
| $f_2$ | $FP_c$ | $C_g$ | offset c | length c | — $S_{f2}$ (204) |
| $f_2$ | $FP_f$ | $C_c$ | offset f | length f | |
| $f_3$ | $FP_b$ | $C_g$ | offset b | length b | |
| $f_3$ | $FP_c$ | $C_g$ | offset c | length c | |
| $f_3$ | $FP_d$ | $C_h$ | offset d | length d | |
| $f_3$ | $FP_e$ | $C_h$ | offset e | length e | — $S_{f3}$ (200) |
| $f_3$ | $FP_f$ | $C_c$ | offset f | length f | |
| $f_n$ | Table $S_{fn}$(360) | | | | |

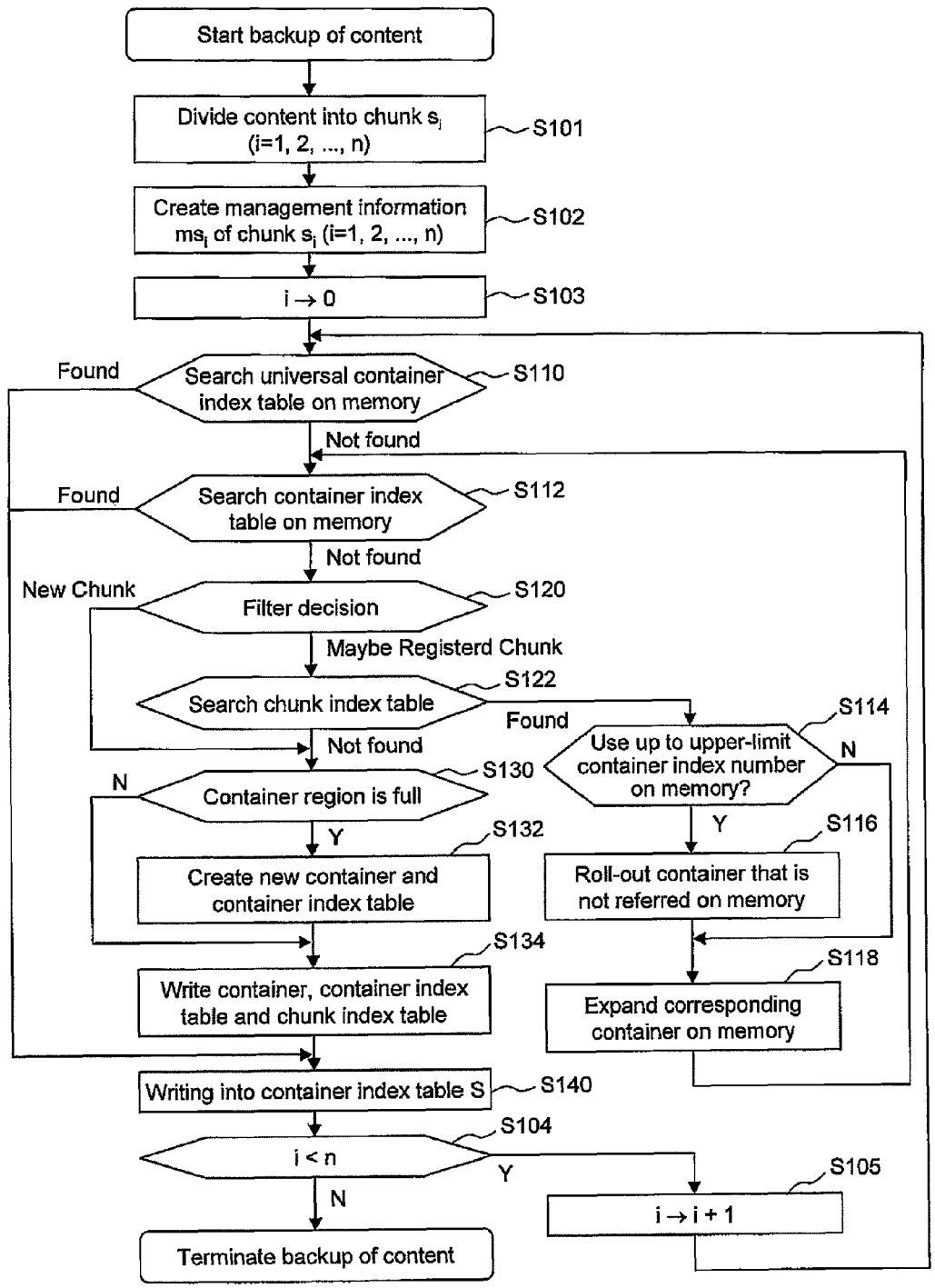

Fig. 7
(1) Measurement table R (160) after deduplication processing of content f1 (260)
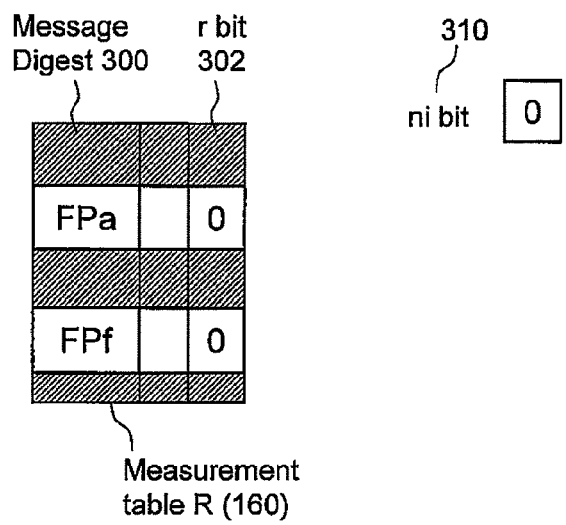
(2) Measurement table R (160) after deduplication processing of content f2 (270)
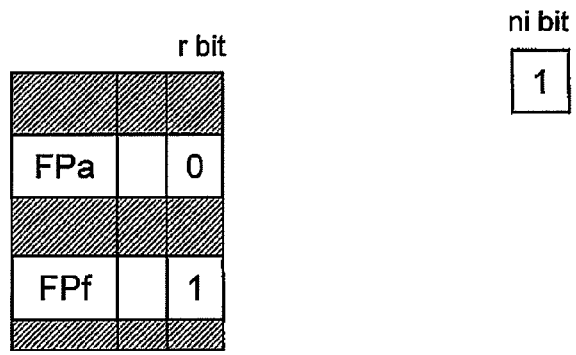
(3) Measurement table R (160) after deduplication processing of content f3 (280)
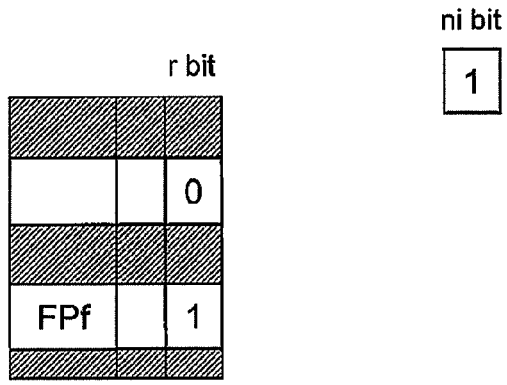

Fig. 13
(A)
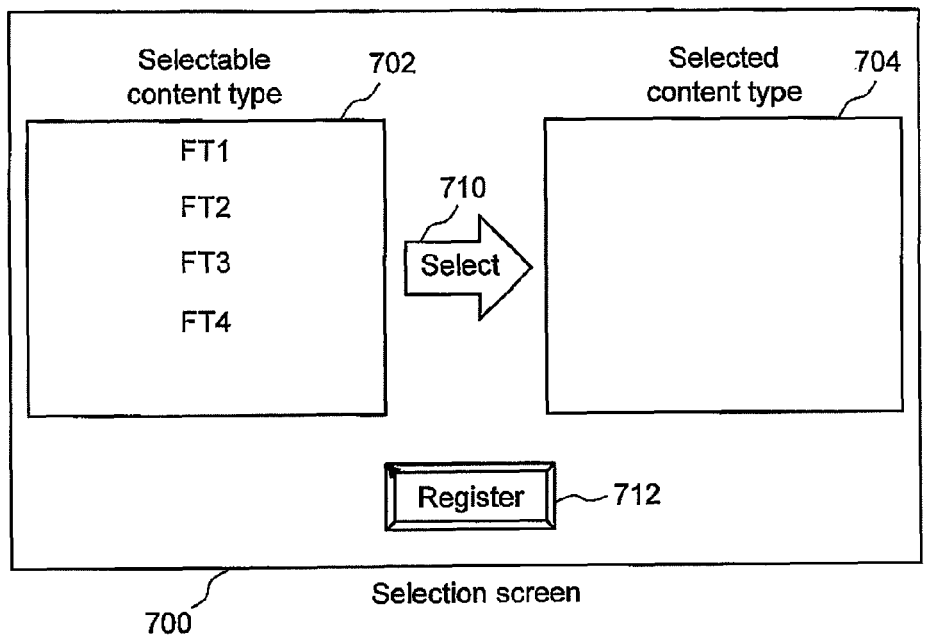
(B)
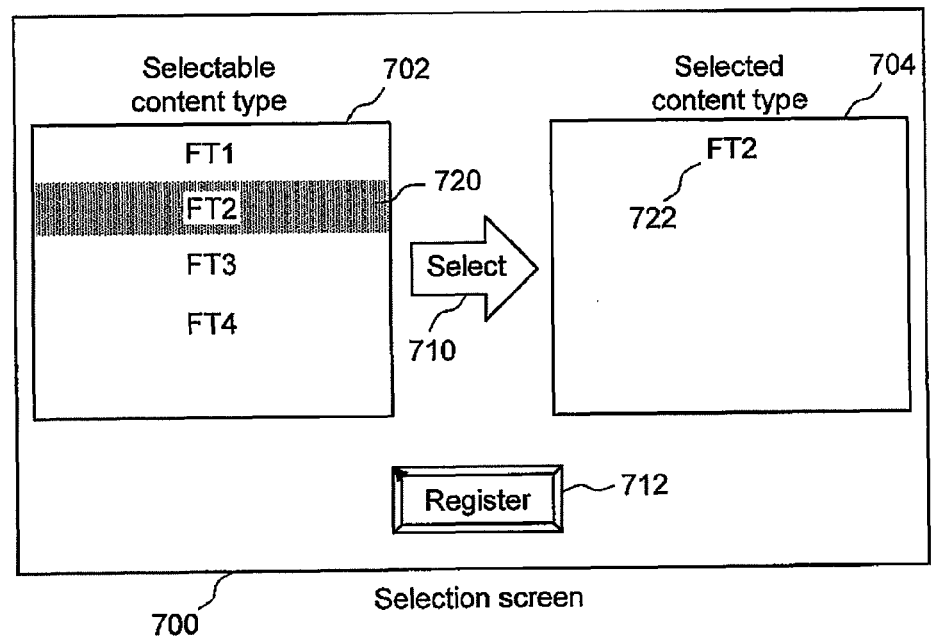

STORAGE DEVICE TO BACKUP CONTENT BASED ON A DEDUPLICATION SYSTEM

TECHNICAL FIELD

The present invention relates to a storage device that backups content based on a deduplication system.

BACKGROUND ART

A host calculator is connected to a storage device via a network. The storage device of this kind includes, for example, a plurality of hard disk drives ("HDDs") as a memory device that memorizes data. When data is stored in the storage device, processing of reducing the amount of data is performed to reduce the cost required for a memory medium. To reduce the amount of data, file compression processing or deduplication processing is used. The file compression processing reduces the data capacity by contracting data segments of the same content in one file. On the other hand, the deduplication processing reduces the total data capacity of a file system or storage system by contracting data segments of the same content detected between files, in addition to one file.

In the following, a data segment of a unit for deduplication processing is referred to as "chunk." Also, data collecting a plurality of chunks is referred to as "container." Also, logically-collected data of a unit to be stored in a memory device is referred to as "content." The content includes a file aggregating normal files such as an archive file, a backup file and a virtual volume file, in addition to a normal file. Chunks subjected to deduplication processing are stored in a memory device in a container unit.

In a container, a predetermined chunk number or predetermined capacity is set. Chunks generated from one or two or more contents are collected until a container is filled, and then written in a memory device in a container unit. After the writing, a container index table showing a chunk storage position in a container is generated depending on each container. At this time, a chunk index table showing which chunk is stored in which container, is generated too. For example, when backup data over multiple generations is deduplicated and stored in a memory device, respective containers are prepared for the generations depending on the backup timing, and the generation backup data is stored in each container (for example, see Patent Literature 1).

CITATION LIST

Patent Literature

PTL 1: U.S. Pat. No. 6,928,526

Non Patent Literature

NPL 1: Andrew S. Tanenbaum and Albert S. Woodhull, Operating Systems: Design and Implementation, Third Edition, Prentice Hall, 2006. 4.4.7 Simulating LRU in Software
NPL 2: Donald E. Knuth, The Art of Computer Programming, Volume 3/Sorting and Searching, Addison-Wesley Publishing Company, 1973. 6.4. Hashing, 6.5. Retrieval on Secondary Keys
NPL 3: Thomas H. Cormen, Charles E. Leiserson, Ronald L. Rivest, Clifford Stein, Introduction to Algorithms, Second Edition, MIT press, 2001. 32.2 The Rabin-Karp algorithm

SUMMARY OF INVENTION

Technical Problem

It should be noted that the backup data includes a chunk that is commonly provided in a plurality of contents. In the following, such a chunk is referred to as "universal chunk." The universal chunk is stored in a container prepared at the time of the initial backup.

However, in a conventional method, in a case where (1) universal chunks are stored in a container prepared at the time of the initial backup and (2) backup data of a second or subsequent generation subjected to deduplication processing is restored, there is a problem that the restoration performance degrades in the following reasons. Specifically, to read the universal chunks, it is necessary to simultaneously read other chunks that are included in the same container and are hardly referred, than the universal chunks. That is, the efficiency of reading data required for restoration is poor.

Also, the conventional method has a problem that the backup performance is low. This is because a container index table referred at the time of deduplication processing includes management information of chunks that are hardly referred in addition to universal chunks. Further, unlike a cache holing high-traffic data in a memory, the universal chunks are necessarily provided over multiple backup generations but are not necessarily high-traffic. Therefore, a normal cache feature is not necessarily provided on a memory and is held on a hard disk drive. Therefore, the container index table is read and expanded on the memory at the time of deduplication processing, but, as described above, the container index table includes much other management information that needs not be referred, than that of the universal chunks. Therefore, the data processing efficiency is poor and there is also a problem in memory use efficiency.

It should be noted that, for example, a universal chunk includes data formed with 0x0, data formed with 0xF, trailer data showing the content end, and padding data of an archive file creating one content by aggregating multiple contents. Here, the padding data denotes data applied such that a boundary of the aggregated contents is integral multiples of defined bytes.

Solution to Problem

The present invention is made taking into account the above technical problems and proposes a storage device that stores first chunks that are commonly provided in each content type, in a first chunk container and manages them.

To be more specific, the storage device according to the present invention has: (1) a memory device that provides a memory region for one or a plurality of first containers used to store first chunks and for one or a plurality of second containers used to store other chunks than the first chunks; and (2) a backup unit that decides whether each of the chunks extracted from the contents of the writing targets is a first duplication chunk duplicating a chunk stored in the first container, and further decides, for only a chunk that is decided not to be the first duplication chunk, whether each of the chunks is a second duplication chunk duplicating a chunk stored in the second container, and then stores only a chunk that is decided not to be the second duplication chunk in the second container.

As described above, in the storage device according to the present invention, first chunks that are commonly provided in each content type are aggregated in a first chunk container Unlike a conventional system, the first container does not include a chunk that is hardly referred in each content. Therefore, the efficiency of first chunk detection is high, which improves the backup performance. Further, at the time of restoration, essential first chunks for restoration are aggregated in the first container, so that it is possible to perform restoration efficiently.

Advantageous Effects of Invention

According to the present invention, it is possible to improve the backup performance and restoration performance compared to the related art. Other problems, configurations and advantages than the above will be clarified by the following explanation of examples.

BRIEF DESCRIPTION OF DRAWINGS

FIG. 4B is a table showing a configuration example of a content index table used in restoration processing.
FIG. 5 is a flowchart showing processing steps of backup processing according to the first example.
FIG. 7 is a table showing configuration examples of measurement tables according to the first example.
FIG. 13 illustrates a selection screen example according to a fifth example.

DESCRIPTION OF EMBODIMENTS

Figure 1:
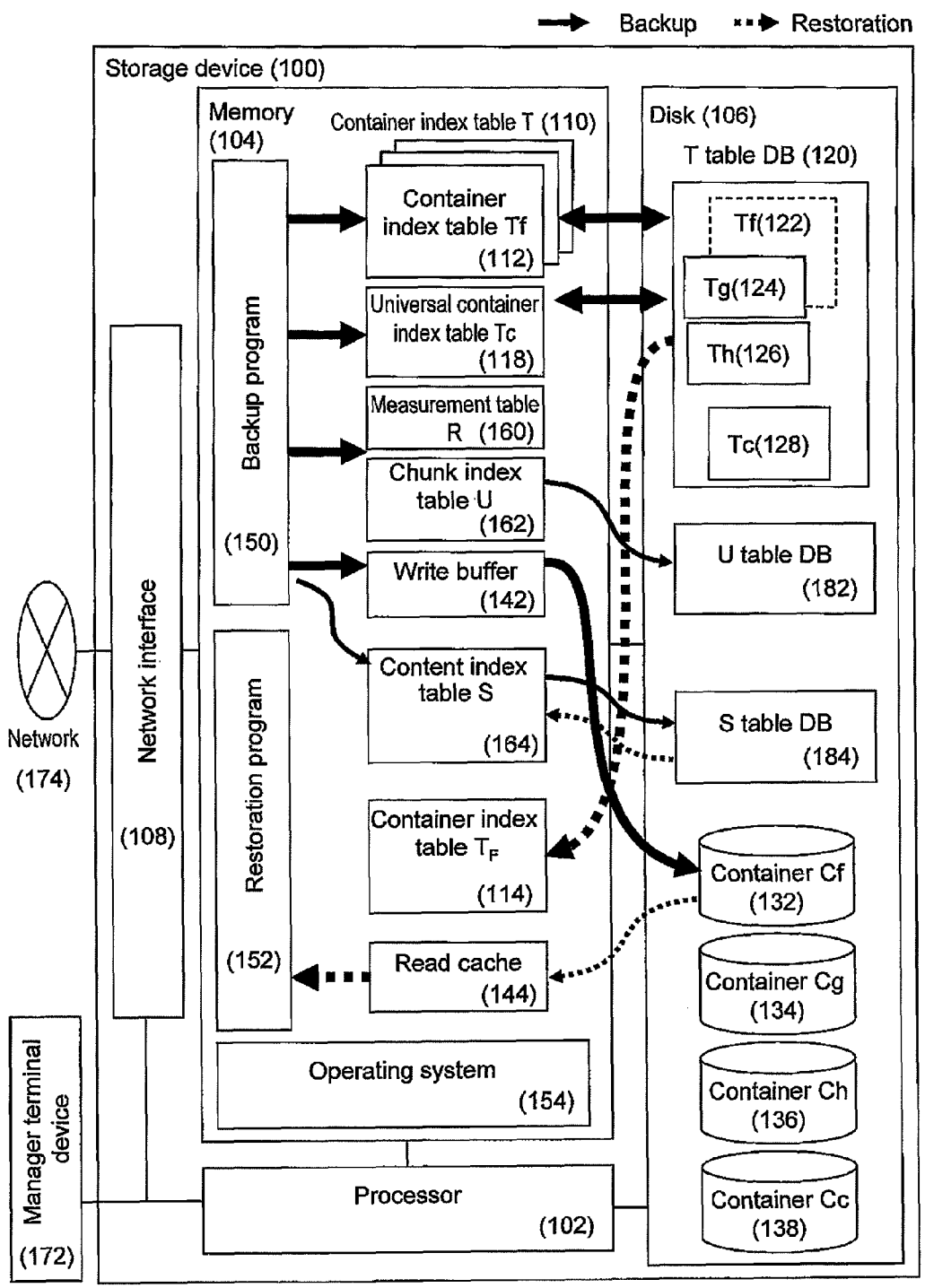
FIG. 1 shows a block diagram of a storage device according to a first example.

Examples of the present invention will be explained below with reference to the drawings. It should be noted that embodiments of the present invention are not limited to the examples described below, and various changes are possible within a range of technical ideas.

(1) First Example (1-1) Outline of Deduplication Function Mounted on Storage Device First, an outline of a deduplication function according to the present example will be explained. The storage device according to the present example is connected to a host calculator via a network. The storage device has, for example, a plurality of hard disk drives as a memory device that memorizes data. The storage device has a processing function of reducing the data capacity when storing data in the memory device. To reduce the data capacity, for example, file compression processing or deduplication processing is used. The file compression processing reduces the data capacity by contracting data segments of the same content in one file. On the other hand, the deduplication processing reduces the total data capacity of a file system or storage system by contracting data segments of the same content detected between files, in addition to one file.

In explanation of the present example, a data segment of a unit for deduplication processing is referred to as "chunk," and data collecting a plurality of chunks is referred to as "container." Also, logically-collected data of a unit to be stored in the memory device is referred to as "content." Even in the case of the present example described below, the content includes a file aggregating normal files such as an archive file, a backup file and a virtual volume file, in addition to a normal file. Also, chunks subjected to deduplication processing are stored in a memory device in a container unit.

Chunk-unit deduplication processing is performed as follows. Before storing an arbitrary chunk in a hard disk drive, the storage device decides whether a chunk of the same content is already stored in the hard disk drive. If it is decided that the same chunk is not present on the hard disk, the storage device stores that chunk as is in the hard disk drive. By contrast, if it is decided that the same chunk is present in the hard disk drive, the storage device does not store that chunk (hereinafter referred to as "duplication chunk") in the hard disk drive but stores link information showing its storage place in the hard disk drive. Thus, the storage device according to the present example repeatedly performs chunk deduplication processing and eliminates an overlapping registration of duplicate chunks. By this duplication chunk elimination processing, the storage device according to the present example suppresses the use capacity of the hard disk drive and speeds up backup processing.

As described above, a "container" denotes a processing unit to be stored in the hard disk drive, which is formed with a plurality of chunks obtained by dividing one or more contents. Also, for each "container," the storage device creates a container index table to manage the arrangement of each chunk forming the container. The container index table stores a chunk offset (or position in the container) and a chunk size. The container index table is used for chunk duplication decision.

In addition, the storage device creates a chunk index table. The chunk index table is a table showing in which container index table the chunks generated by dividing backup data are stored. The chunk index table is created by the storage device when a container for chunk storage is determined. The chunk index table is used to determine a container index table used for chunk deduplication decision at the time of execution of backup processing.

Generally, the chunk size is equal to or greater than several kilobytes. Therefore, at the time of execution of duplication decision processing, when chunks are compared in order from the head chunk, much processing time and high cost are required. Therefore, the storage device according to the present example uses a chunk message digest and enables duplication decision processing with shorter time and lower cost. The message digest denotes a technique of outputting a fixed-length digest in response to an arbitrary-length data input. In the present specification, an output result of the message digest is referred to as "finger print." The finger print can be obtained using a hash function. For example, a hash function, which provides an extremely high randomness and is likely to be uniquely determined for chunks such as SHA256 is used.

In the present example, the finger prints of chunks are stored in the above-described container index table and the chunk finger prints are compared at the time of duplication decision processing. By this means, compared to a case where chunks are compared in bit units, higher-speed and lower-cost duplication decision processing is realized.

Also, to maintain the data integrity and realize backup of high reliability, the present example uses a write-once-type memory device. In the write-once-type memory device, although the data writing is possible only one time, the reading is possible as many times as required. Data written in the write-once-type memory device cannot be deleted or changed, and is therefore suitable to an archive for evidence preservation. Examples of such a memory device include an optical disk drive that uses an ROM (Read Only Memory) optical disk. Generally, a magnetic disk drive can update written data and therefore is not a write-once-type memory device. However, by shaping a configuration of a file system or driver device and allowing only an additional writing (i.e. prohibiting the overwriting of data), it is possible to use a magnetic disk device as a write-once-type memory device. In a preferred embodiment of the present example, mainly, a recordable hard disk drive suitable to data backup is applied as a backup memory device.

In the above-described container, a predetermined chunk number or capacity is set. Therefore, chunks are collected until the container is filled, and written in a memory device in a container unit when the container is filled. For example, when the recordable hard disk drive is used as a memory device, the storage device additionally writes chunks in the container on a memory until the container is filled. At the same time, the storage device creates a container index table to manage the arrangement of chunks in the container and a chunk index table to manage correspondence relationships between the chunks and the container index table. It should be noted that backup data includes a universal chunk that is necessarily provided every backup generation, and the universal chunks are stored in a container prepared at the time of the initial backup.

As described above, in a case where universal chunks are stored in a container prepared at the time of the initial backup, other chunks than the universal chunks are stored in the same container in a conventional method. Therefore, in the conventional method, when backup data of a second or subsequent generation subjected to deduplication processing is restored, universal chunks are included, but, in the restoration, the container to be referred includes a chunk that needs not be referred. However, when the ratio of universal chunks to the container is low, a case is possible where the universal chunks are dispersed on a plurality of containers. In this case, it is necessary to separately refer to other containers including necessary universal chunks, and the number of readings from a hard disk drive increases. Consequently, there is a problem that the restoration performance degrades. Also, when a container including a universal chunk is expanded on a memory, chunks that are hardly referred are expanded together, and therefore there is a problem that the memory use efficiency is poor.

Also, in the conventional method, at the time of backup, a container index table is necessarily referred to perform deduplication processing of data. Here, in the case of deduplication processing in a second or subsequent generation, it is necessary to refer to a container index table including management information of chunks that are hardly referred in addition to universal chunks. Consequently, there is a problem that the backup performance degrades. Also, the container index table includes management information of chunks that are hardly referred in addition to management information of universal chunks, and therefore there is a problem that the memory use efficiency is poor.

Therefore, in the present example, when backup data over multiple generations are deduplicated and stored in a memory device, a universal chunk that is necessarily provided in each backup generation is stored in a container unique to universal chunks (hereinafter referred to as "universal container"). Further, in the present example, a created universal container is always held on a memory to reduce the number of readings from the hard disk drive. By this means, an improvement of backup performance and restoration performance is realized.

It should be noted that a universal chunk is commonly provided every content type (i.e. file format such as a normal file, a virtual disk volume and an archive file). Therefore, by comparing duplication chunks for content types, it is possible to specify the universal chunks.

(1-2) Configuration of Storage Device

FIG. 1 shows a hardware configuration of a storage device 100 according to the present example. As shown in FIG. 1, the storage device 100 is connected to a backup server and other higher devices (not shown) via a network 174. The network 174 may be, for example, a LAN (Local Area Network), the Internet, a public line or a dedicated line.

The storage device 100 is connected to a manager terminal device 172 via a network. The manager terminal device 172 is a computer device including information processing resources such as a CPU and a memory, output devices such as a display, and input devices such as a keyboard. The manager terminal device 172 instructs an activation or deactivation of the storage device 100 according to, for example, an operator's input operation. Further, the manager terminal device 172 monitors an operation of the storage device 100 and records, for example, an operation result log and a failure occurrence log. Further, the manager terminal device 172 designates a system setting related to backup processing and restoration processing in the storage device 100.

The storage device 100 is mainly configured with a processor 102, a memory 104, a disk 106 and a network interface 108.

The processor 102 functions as a computation processing device and controls an operation of the storage device 100 according to programs or computation parameters memorized in the memory 104.

The memory 104 stores an operating system 154, various programs cooperated with the operating system 154, a backup program 150, a restoration program 152, a new chunk decision filter (not shown) and various tables.

The backup program 150 stores backup target data provided through the network 174 in the disk 106, using a container index table (T) 110, a chunk index table 162, a universal container index table 118, a measurement table 160 and a write buffer 142.

As shown in FIG. 1, a plurality of the container index tables 110 are present on the memory 104. In the following, the container index table 110 used by the backup program 150 is referred to as "container index table $(T_f)$ 112" and the container index table 110 used by the restoration program 152 is referred to as "container index table $(T_F)$ 114." The container index table 110 denotes a table to manage chunk storage destination in a container unit. A configuration of the container index table 110 will be explained below in detail.

A universal container index table ($T_c$) 118 denotes a table to manage storage destination of a universal chunk that is necessarily provided every backup generation. The universal container index table ($T_c$) 118 is expanded on the memory 104 together with the backup program 150 and held as is on the memory 104.

The container index table 112 is created for each container. When the backup program 150 performs duplication decision processing, a finger print of at least one container index table 112 is referred. Therefore, it is necessary to expand the container index table 112 on the memory 104. However, the capacity of the memory 104 is limited. Consequently, it is difficult to expand all of the container index table 112 on the memory 104. Therefore, by rolling-in the container index table 112 from the disk 106 to the memory 104 or rolling-out the container index table 112 from the memory 104 to disk 106, the storage device 100 uses resources of the memory 104 effectively.

In the present example, the roll-in/roll-out of the container index table 112 is performed in an LRU (Least Recently Used) system. In the LRU system, data that is not referred for the longest time on the memory 104 is rolled-out while data that is newly referred is rolled-in from the disk 106 to the memory 104. This control operation is based on a characteristic that the data that is not referred for the longest time has the least possibility of being referred next. For the roll-in/roll-out control, it is necessary to transparently access both the memory 104 and the disk 106. Therefore, this control is provided by the operating system 154 and the processor 102. This control technique is called "virtual memory management technique." Page replacement processing in a virtual memory is performed using three kinds of bits of a reference bit ("r bit"), an update bit ("c bit") and a valid/invalid bit ("v bit"). These bits are updated every time a chunk included in content arrives.

In the present example, such a virtual memory management technique is realized using the container index table ($T_f$) 112. For example, when a duplication chunk is included in content, a reference bit (or "r" bit) of a container to store this chunk is set to "1." By contrast, when a chunk included in the content is written in the disk 106, an update bit (or "c" bit) of a container to store this chunk is set to "1." Also, when the container index table 112 is rolled-in, a "v" bit is set to "1." By contrast, when the container index table 112 is rolled-out, the "v" bit is set to "0."

Also, examples of an implementation method of the LRU system include an aging method (for example, see NPL 1). In the aging method, a plurality of reference bits (or "r" bits) are provided. In the aging method, the bit values of the reference bits (or "r" bits) are shifted in the right direction at predetermined time intervals. Especially, in a case where a reference is performed, the aging method sets the most significant bit to "1" after the right-shift operation. By this shift computation processing, it is possible to easily realize the weighting described below. For example, the weighting becomes less when the reference timing is later, and the weighting becomes greater when the reference timing is closer to the present time. For example, regarding given data, five reference bits obtained at predetermined time intervals are provided as follows. Here, "1" of the bit shows that a reference is performed.
First time: 1
Second time: 0
Third time: 1
Fourth time: 0
Fifth time: 0

When the above-mentioned reference bits are weighted and expressed as an eight-bit counter value, the result is as follows. It should be noted that the initial value is "00000000."
First time: 10000000
Second time: 01000000 (shift right+assign "0")
Third time: 10100000 (shift right+assign "1")
Fourth time: 01010000 (shift right+assign "0")
Fifth time: 00101000 (shift right+assign "0")

In this way, by expressing the reference bits (or "r" bits) by an eight-bit counter value, the value of data that was referred later is expressed by a smaller value, and the value of data that was referred at the timing closer to the present is expressed by a larger value.

The measurement table 160 is used to not only manage the roll-in/roll-out of the container index table 110 but also manage in a container unit whether there is a duplex chunk or the number of duplex chunks. A table for roll-in/roll-out management and a table for duplex chunk management are not necessarily configured as one table, and may be configured by separate tables. As described above, in the present example, a table for roll-in/roll-out management and a table for duplex chunk management are configured as one table. A configuration of the measurement table 160 will be described later in detail.

The restoration program 152 reads backup data stored in the disk 106 using a content index table (s) 164, the container index table ($T_F$) 114 and a read cache 144.

The content index table (s) 164 denotes a table to manage chunk storage destination in a content unit. Configuration content of the content index table 164 will be described later in detail.

The disk 106 is formed with a hard disk drive or the like, and stores a container index table (Table "T") DB 120, a chunk index table (Table "U") DB 182, a content index table (Table "S") DB 184 and containers (containers 132, 134, 136 and 138). The container index table DB 120 stores a plurality of container index tables (i.e. tables 122, 124, 126 and 128). The chunk index table DB 182 stores a plurality of chunk index tables. The content index table DB 184 stores a plurality of content index tables.

The universal container index table 118 may be stored in the container index table DB 120 or stored as independent DB (not shown). Also, the containers 132, 134, 136 and 138 store backup data subjected to deduplication processing by the backup program 150. At the time of this storage, the write buffer 142 is used.

(1-3) Outline of Backup Processing and Restoration Processing

To figure out backup processing and restoration processing according to the present example, first, conventional backup processing and restoration processing will be explained.

(1-3-1) Conventional Backup Processing and Restoration Processing

The conventional method will be explained using FIG. 2. A backup program 1450 used in the conventional method backups a content $f_1$ (1460), a content $f_2$ (1470) and a content $f_3$ (1480) in order of arrival. Here, the content $f_1$ (1460) is backup data of the first generation, the content $f_2$ (1470) is backup data of the second generation and the content $f_3$ (1480) is backup data of the third generation.

Figure 2:
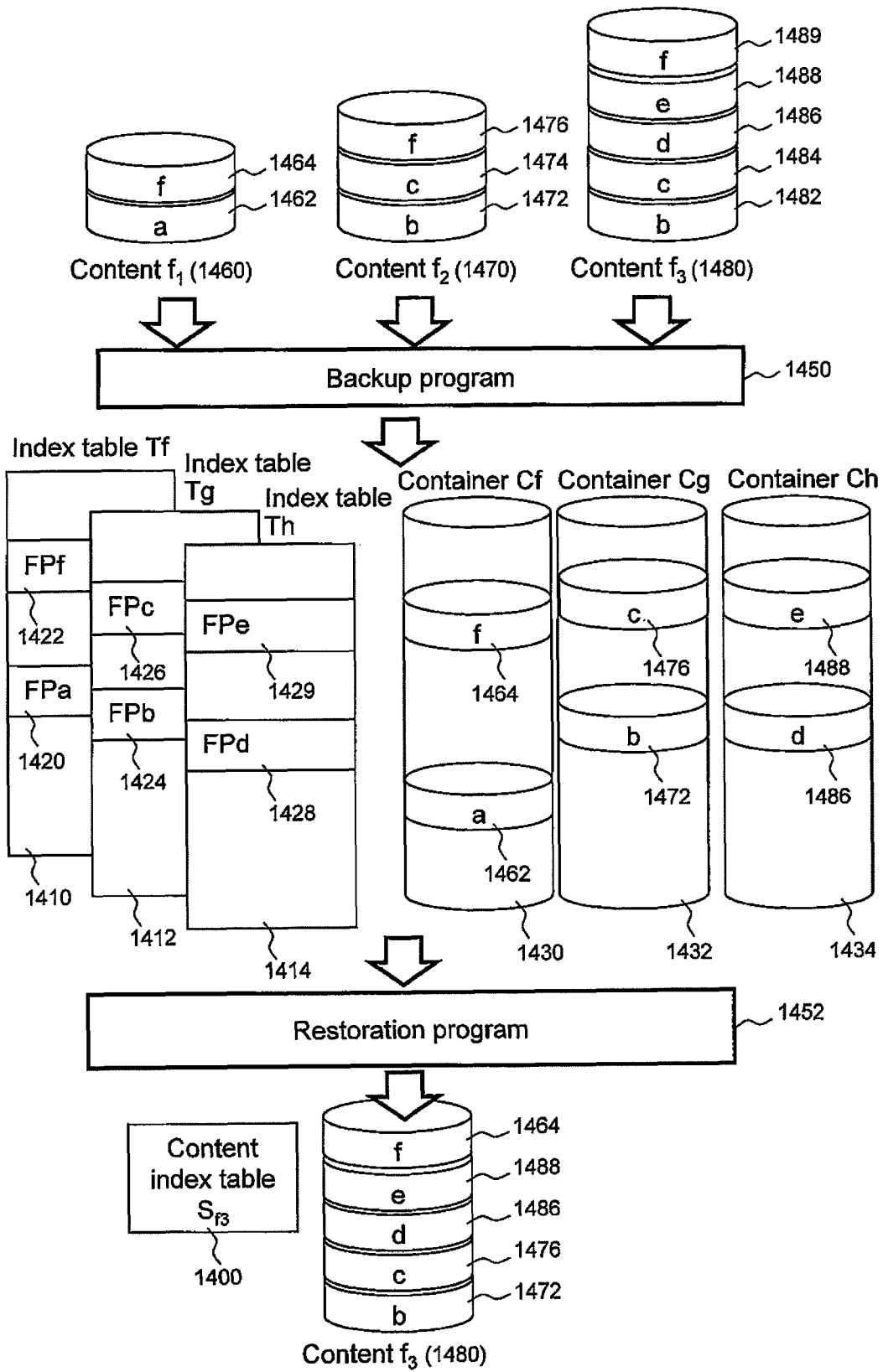
FIG. 2 conceptually illustrates conventional backup processing and restoration processing.

As shown in FIG. 2, the content $f_1$ includes a chunk "a" (1462) and a universal chunk "f" (1464). The content $f_2$ includes a chunk "b" (1472), a chunk "c" (1474) and a universal chunk "f" (1476). The content $f_3$ includes a chunk "b" (1482), a chunk "c" (1484), a chunk "d" (1486), a chunk "e" (1488) and a universal chunk "f" (1489). The contents $f_1$ to $f_3$ are subjected to deduplication processing by the backup program 1450 and then stored in the memory device. Therefore, containers Cf (1430), Cg (1432) and Ch (1434) store the chunk "a" (1462), the universal chunk "f" (1464), the chunk "b" (1472), the chunk "c" (1476), the chunk "d" (1486) and the chunk "e" (1488).

Here, a case will be considered where the arrival interval between first-generation backup data and second-generation backup data is wide, that is, where there is a large interval after the content $f_1$ (1460) is backed up and before the content $f_2$ (1470) is backed up. In this case, the backup program 1450 stores the chunk "a" (1462) and the universal chunk "f" (1464) of the content $f_1$ in the container Cf (1430).

However, in the conventional method, chunks are stored in containers in order of arrival. That is, chunk content is not taken into account. Therefore, when the content $f_2$ is backed up, a case is possible where the container Cf is already filled with chunks of other contents that are not related to generations. In this case, the chunk "b" (1472) and the chunk "c" (1476) are stored in the container Cg (1432) different from that of the chunk "a." Similarly, the chunk "d" and the chunk "e" of the content $f_3$ are stored in the container Ch (1434) different from the container Cf (1430) and the container Cg (1432). Also, in association with these containers, container index tables Tf (1410), Tg (1412) and Th (1414) are created. That is, the universal chunk "f" is stored in the initial container Cf (1430) and an associated container index table is stored in a container index table Tf (1410).

For example, when the content $f_3$ (1480) is restored, in the conventional method, three containers Cf (1430), Cg (1432) and Ch (1434) are expanded on the memory.

At this time, a restoration program 1452 refers only to the universal chunk "f" (1464) from the expanded container Cf (1430). That is, the chunk "a" is not referred. Thus, the restoration program 1452 needs to expand, on the memory, the chunk "a" (1462) which needs not be referred for restoration of the content $f_3$ (1480).

Also, when data is backed up, in the conventional method, the backup program 1450 refers to, for example, the container index table Tf (1410) and performs deduplication processing of data. For example, when the content $f_3$ (1480) is backed up, the backup program 1450 expands the container index tables Tf (1410) and Tg (1412) on the memory and checks them against management information of the chunks extracted from the content $f_3$ (1480). Here, the expanded container index table Tf (1410) is referred only for deduplication processing of the universal chunk "f" and needs not be referred for deduplication processing of other chunks (i.e., b, c, d and e). Thus, in the conventional method, expansion needs to be performed on the memory in a container or container index table unit, and therefore data that is hardly referred needs to be expanded on the memory.

Thus, in the conventional method, it is necessary to expand data including data that is hardly referred at the time of backup or restoration on the memory, and the data that is hardly referred degrades the backup performance and restoration performance.

(1-3-2) Outline of Backup Processing in the Present Example

An outline of backup processing in the storage device 100 according to the present example will be explained with reference to FIG. 3. Similar to the case of FIG. 2, it is presumed that the backup program 150 backups contents $f_1$ (260), $f_2$ (270) and $f_3$ (280) in order of arrival. Here, it is presumed that the content $f_1$ (260) arrives first, the content $f_2$ (270) arrives second and the content $f_3$ (280) arrives third.

Figure 3:
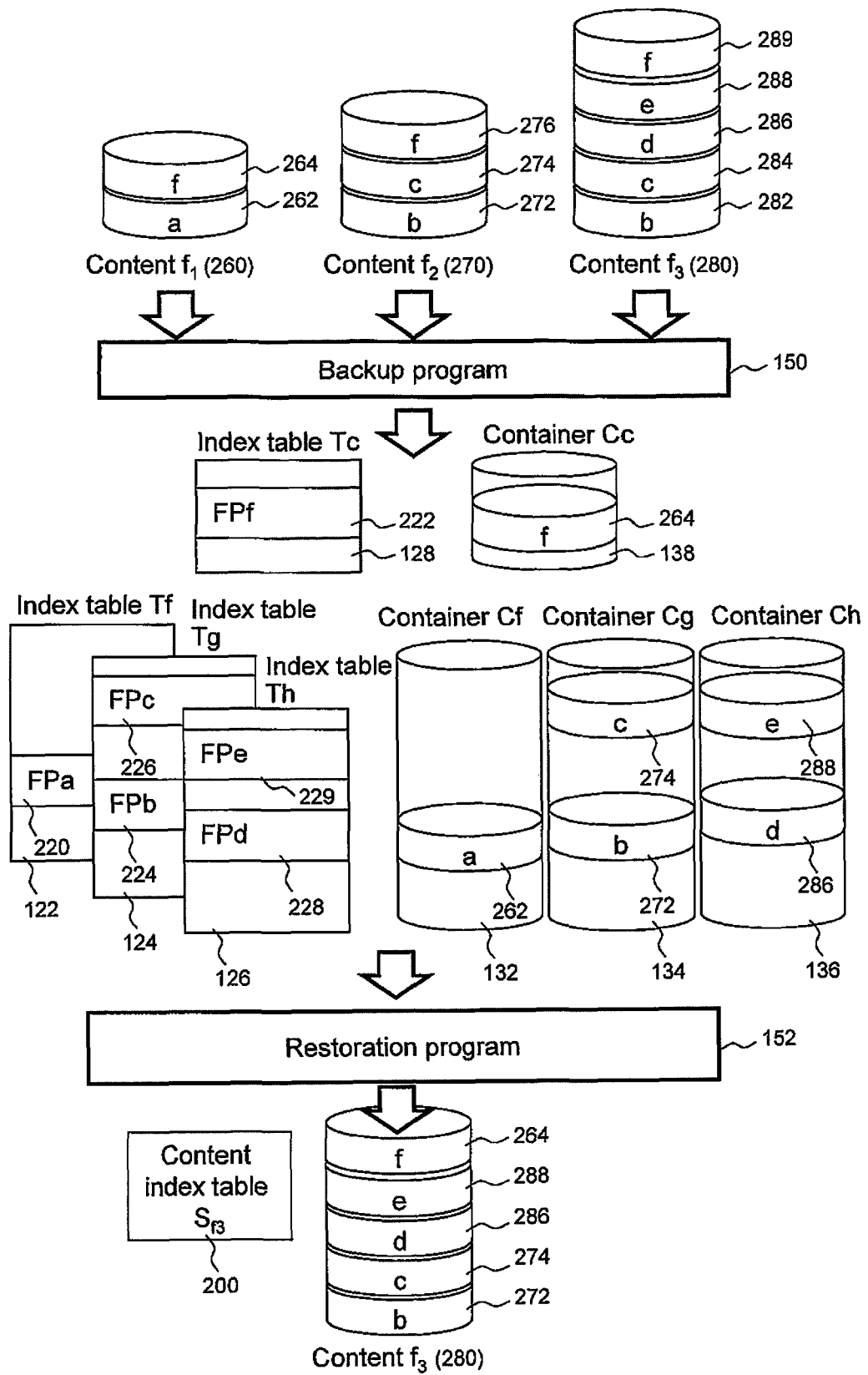
FIG. 3 conceptually illustrates backup processing according to the first example.

As shown in FIG. 3, the content $f_1$ includes a chunk "a" (262) and a universal chunk "f" (264). The content $f_2$ includes a chunk "b" (272), a chunk "c" (274) and a universal chunk "f" (276). The content $f_3$ includes a chunk "b" (282), a chunk "c" (284), a chunk "d" (286), a chunk "e" (288) and a universal chunk "f" (289).

As shown in FIG. 3, in the case of the present example, the backup program 150 prepares a universal container index table Tc (128) associated with a universal container Cc (138). Here, the container index table Tc may be always held on the memory 104. Also, the container Cc may be always held on the memory 104. Only universal chunks and their management information are stored in the universal container Cc and the universal container index table Tc. For example, at the time of the activation of the backup program 150, the universal container index table Tc (128) is expanded on the memory 104, and, at the time of the deactivation of this program, the universal container index table Tc (128) is stored in the disk 106. Similarly, at the time of the activation of the backup program 150, the universal container Cc (138) is expanded on the memory 104, and, at the time of the deactivation of this program, the universal container Cc (138) is stored in the disk 106.

These instructions for the backup program 150 (such as command issue) are performed through an operator's operation input for the manager terminal device 172. However, a case is assumed where these instructions for the backup program 150 are not designated from the manger terminal device 172. In this case, an associated instruction may be stored in advance as an initial value in, for example, an initialized file, and this initial value may be read at the activation of the backup program 150.

In the case of the present example, the backup program 150 newly creates a container Cf (132) to store the content $f_1$, and stores the chunk "a" (264) in this container. It should be noted that the chunk "f" (242) is deduplicated with reference to the universal container index table Tc (128). Consequently, the chunk "f" is not stored in the container Cf (132). As a result, the container index table Tf (122) stores management information FPa (220) of the chunk "a." It should be noted that the universal container index table Tc (128) stores management information FPf (222) of the universal chunk "f."

Next, the backup program 150 backups the content f2 (270). In this case, among the chunks "b" (272), "c" (274) and "f" (276), the backup program 150 stores only the chunks "b" and "c" in a container Cg (134), except for the chunk "f" that is a duplication chunk. It is natural that, when the content $f_2$ (270) arrives after the content $f_1$ (260), the backup program 150 may store the chunks "b" and "c" in the container Cf (132), but it is presumed that the container Cf (132) is already filled. The backup program 150 creates a container index table Tg (124) associated with the container Cg (134) to store management information FPb (224) and FPc (226) of the chunks "b" and "c."

Similarly, in a case where the content $f_3$ is backed up, among the chunks "b" (282), "c" (284), "d" (286), "e" (288) and "f" (289), the backup program 150 detects the chunks "b", "c" and "f" using the universal container index table Tc (128) and the container index table Tg (124), and stores other chunks "d" and "e" in a container Ch (136). After that, the backup program 150 stores management information FPd (228) and FPe (229) of the chunks "d" and "e" in the container index table Th (126).

Thus, upon deduplication decision of the content $f_3$, the backup program 150 according to the present example merely expands the universal container index table Tc (128) and the container index table Tg (124) on the memory 104. On the other hand, in the case of restoring the content $f_3$ (280), the restoration program 152 reads the content $f_3$ (280) with reference to the containers Cg (134) and Ch (136) and the universal container Cc (138).

(1-3-3) Configuration of Various Index Tables Used in the Present Example

Figure 4A:
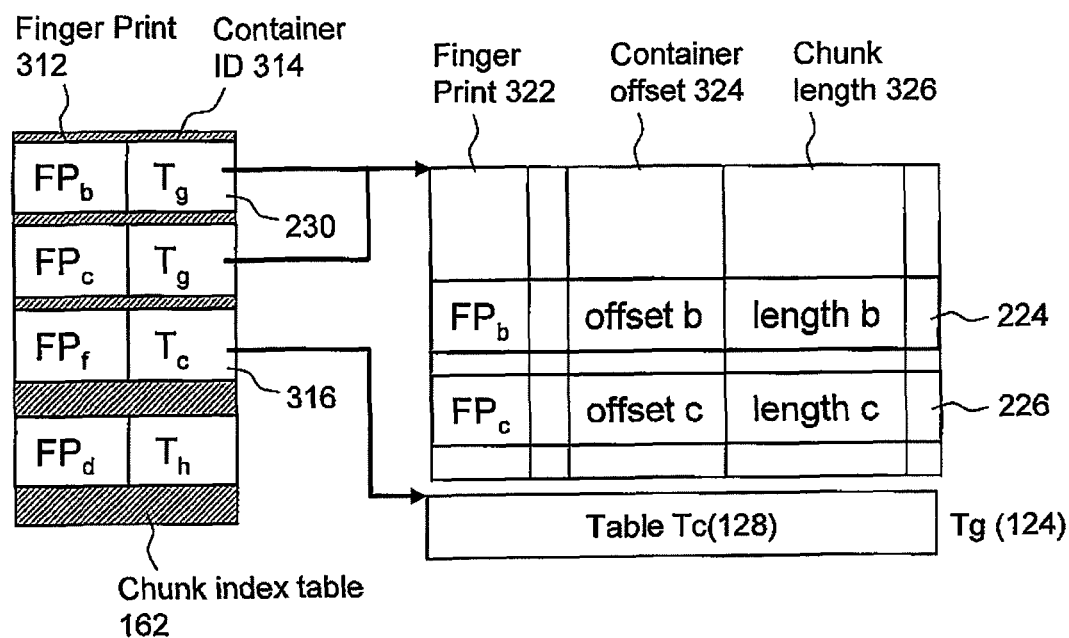
FIG. 4A is a table showing configuration examples of a container index table and chunk index table used in backup processing and restoration processing.

Referring to FIG. 4A, configuration examples of the container index table "T" (110) and the chunk index table "U" (162) used at the time of backup processing and restoration processing will be explained. The container index table 110 denotes a table created in a container unit. Also, the chunk index table 162 denotes a table to manage chunks stored in a container.

FIG. 4A shows the container index table Tg (124) as an example of the container index table 110 and the universal container index table Tc (128). The container index table 110 and the universal container index table Tc (128) have the same configuration and are configured with a finger print field 322, a container offset field 324 and a chunk length field 326.

The finger print field 322 stores a chunk finger print. The container offset field 324 stores an offset value to give a chunk head position in a container. The chunk length field 326 stores information showing a chunk length. That is, each row of the container index table 110 stores chunk management information. The container index table 110 in FIG. 4A corresponds to a state after the content $f_2$ shown in FIG. 3 arrives. Consequently, the management information 224 of the chunk "b" and the management information 226 of the chunk "c" are stored.

A plurality of container index tables 110 are managed by the chunk index table 162. In the chunk index table 162, a container ID 314 to identify containers and a finger print 312 of a chunk are associated. Here, the container ID 314 is equally used as pointer information that can refer to the container index table 110. In the present example, a container index table (TF) associated with a container ID (CF) is communalized by an identifier called "uuid (universally unique identifier)."

It should be noted that it may be decided to refer to the chunk index table 162 according to a processing result of filter processing to identify whether a new chunk is provided. That is, a chunk that is not surely recorded in the chunk index table 162 may skip reference processing in the chunk index table 162 and be directly stored in a new container. By employing this processing method, it is possible to reduce the number of times to refer to the chunk index table 162.

For example, it is presumed that the disk 106 has four files of a container, a container index table, a chunk index table and a content index table, which are arranged under four respective directories.

Container/uuid-Cf: container itself
ContainerIndexIndex/uuid-Cf: container index table database (file to store table TF)
ChunkIndex/High-order Nbit of fp: chunk index table database
Contents/uuid-Cf: content index table database For example, in a case where the container index table Tg is not expanded on the memory 104, when the content $f_3$ is backed up, the backup program 150 searches the chunk index table 162 using the management information FPb of the chunk "b." In the case of FIG. 4A, the management information FPb is associated with a container ID of Tg (230). Therefore, the backup program 150 expands the container index table Tg (124) on the memory 104. Storage information of the chunk "c" can be subjected to duplication decision by searching the expanded container index table Tg (124).

As described above, the universal container index table Tc (128) has the same configuration as the container index table 110. That is, the universal container index table Tc (128) is configured with the finger print field 322, the container offset field 324 and the chunk length field 326. It is omitted in FIG. 4A on the ground of the paper. However, at the activation of the backup program 150, the universal container index table Tc (128) is expanded and held on the memory 104. Therefore, for example, information of the universal container index table Tc (128) storing the universal chunk "f" may be or may not be registered in the chunk index table 162. This is because, in the case of the present example, as described later, since the universal container index table Tc (128) is necessarily searched before the chunk index table 162 is searched, it is not necessary to refer to the chunk index table 162 for the purpose of detecting in which container index table the universal chunk "f" is registered.

Next, referring to FIG. 4B, a configuration example of the content index table "S" (164) used at the time of restoration will be explained. The content index table 164 denotes a table which is created in a content unit and manages chunks included in content. The content index table 164 is configured with a content ID field 361, a finger print field 362, a container ID field 364, a content offset field 366 and a chunk length field 368.

The content ID field 361 stores information to identify content. The finger print field 362 stores a chunk finger print. The container ID field 364 stores identification information of a container storing a chunk. The content offset field 366 stores information showing a chunk position in content. The chunk length field 368 stores information showing a chunk length.

For example, as an example of the content index table 164, FIG. 4B shows $Sf_1$ (202), $Sf_2$ (204), $Sf_3$ (200) and $Sf_n$ (360). Among these, $Sf_3$ (200) stores information of the content $f_3$ shown in FIG. 3. By the information of the content $f_3$, it is found that the content $f_3$ is reconfigurable by the chunks "b," "c," "d," "e" and "f," and further it is found in which container and region (offset and chunk length) each chunk is stored.

A content offset (366) and chunk length (368) forming the content index table 164 show a logical chunk position in content. It should be noted that the chunk offset (324) and the chunk length (326) in the above-described container index table 110 (in FIG. 4A) show a physical chunk arrangement in the disk 106.

At the time of restoration, the restoration program 152 refers to the content index table 164, obtains the container ID of each chunk and searches the container index table 110 from the container ID. Next, the restoration program 152 obtains the physical storage position of each chunk based on information stored in the container index table 110, and reads the chunk from the disk 106. After that, the restoration program 152 reconfigures content according to the logical arrangement in the content index table 164.

(1-3-4) Details of Backup Processing Operation According to the Present Example

FIG. 5 shows details of backup processing operations executed by the backup program 150. First, the backup program 150 divides the backup target content into chunks $s_i$ (i=1, 2, . . . , n) (step S101).

Next, the backup program 150 creates management information $ms_i$ (i=1, 2, ..., n) of the chunks $s_i$ (step S102). The chunk management information $ms_i$ includes a chunk finger print, a chunk position (offset) in the content and a chunk length.

Next, the backup program 150 initializes a counter "i" used for loop processing (i=0) and starts duplication decision of the chunks $s_i$ as described below (step S103).

The backup program 150 searches the universal container index table Tc (118) expanded on the memory 104 and performs duplication decision (step S110). To be more specific, the backup program 150 decides whether a finger print corresponding to a finger print of the chunk divided in step S101 is included in the universal container index table Tc (128). If the chunk finger print corresponds to a finger print in the universal container index table Tc (128), the backup program 150 decides "duplication existent," and, otherwise, decides "duplication non-existent." Here, the universal container index table Tc (128) is read and resident on the memory 104 at the time of program activation of the backup program 150, and written in the disk 106 at the time of deactivation of the backup program 150.

In step S110, if the chunk $s_i$ having a corresponding finger print is found in step S110 (i.e. if it is decided that a duplication chunk is provided), the backup program 150 executes processing in step S140. By contrast, if the chunk $s_i$ having a corresponding finger print is not found in step S110 (i.e. if it is decided that a duplication chunk is not provided), the backup program 150 executes processing in step S112.

In step S112, the backup program 150 searches the container index table Tf (112) on the memory 104 to perform duplication decision. In step S112, if the chunk s, having a corresponding finger print is found (i.e. if it is decided that a duplication chunk is provided), the backup program 150 executes processing in step S140. By contrast, if the chunk $s_i$ having a corresponding finger print is not found in step S112 (i.e. if it is decided that a duplication chunk is not provided), the backup program 150 executes processing in step S120.

In step S120, the backup program 150 decides whether a duplication chunk is provided, using a filter. In step S120, if it is decided that the chunk $s_i$ is a new chunk, the backup program 150 executes processing in step S130. By contrast, if it is decided that the chunk $s_i$ is likely to be a duplication chunk, the backup program 150 executes processing in step S122.

In step S122, the backup program 150 searches the chunk index table "U" (162) and decides whether the chunk $s_i$ is a duplication chunk. In step S122, if the chunk $s_i$ is not found, the backup program 150 executes processing in step S130. By contrast, if the chunk $s_i$ is found in step S122, the backup program 150 obtains the container ID to store the chunk $s_i$ and executes processing in step S114.

In step S114, the backup program 150 decides whether the container index table Tf (112) is expanded on the memory 104 up to the upper-limit container index table number on the memory. In step S114, if it is decided to be used up to the upper limit, the backup program 150 rolls-out a container that is least-referred in the container index table Tf (112) expanded on the memory (step S116), and executes processing in step S118. By contrast, if it is decided to be not used up to the upper limit in step S114, the backup program 150 executes the processing in step S118.

Here, the "upper-limit container index table number on the memory" is designated through, for example, a command that is made in response to an operator's operation input for the manager terminal device 172. Also, if the "upper-limit container index table number on the memory" is not designated through the manager terminal device 172, this value may be stored in advance as an initial value in, for example, an initialized file. This initial value is read by the backup program 150 at the time of activation.

In step S118, the backup program 150 expands the container index table Tf (112) storing the chunk $s_i$ on the memory 104. After the execution in step S118, the backup program 150 returns to step S112.

As described above, in the case of the present example, the backup program 150 performs duplication decision processing using the chunk index table "U" (162) and the container index table "T" (110) together. The memory 104 is limited, and therefore it is not possible to expand the entire container index table 110 on the memory 104. Therefore, by performing duplication decision in two stages of the container index table 110 and the chunk index table 162 and aggregating chunks that is highly associated with the container index table, it is possible to reduce the entry number of the container index table required for duplication decision and reduce the input/output number with the disk 106 without decreasing the memory capacity of the memory 104.

If it is decided to be a new chunk in above step S120 or if the search target chunk is not found in the chunk index table in step S122, the backup program 150 decides whether the container region is full (step S130). In step S130, if it is decided to be full, the backup program 150 creates a new container and its container index table (step S132) and executes step S134. By contrast, if it is not decided to be full in step S130, the backup program executes step S134.

In step S134, the backup program 150 writes the chunk $s_i$ in the container, writes the management information $ms_i$ of the chunk $s_i$ in the container index table and writes a message digest of the chunk $s_i$ in the chunk index table. Here, the processing in step S134 may adopt processing of writing the container, container index table and chunk index table if the container written in the write buffer 142 is full in the processing in step S130, and performing the above writing in a container, container index table and chunk index table on the write buffer 142. By adopting this processing, it is possible to reduce the input/output number with the disk 106 and improve the backup performance.

After execution of step S134, the backup program 150 executes step S140. In step S140, the backup program 150 writes the content index table "S" (164) for restoration.

After that, the backup program 150 decides whether duplication decision processing and writing processing for all chunks are finished (step S104). To be more specific, the backup program 150 compares a chunk number "n" included in the content and the counter number of the counter "i."

In step S104, if it is decided that duplication decision processing and writing processing for all chunks are finished, the backup program 150 finishes backup processing of the content. By contrast, in step S104, if it is decided that duplication decision processing and writing processing for all chunks are not finished, the backup program 150 adds "1" to the counter "i" and returns to step S104 (step S105).

(1-3-5) Details of Restoration Processing Operation in the Present Example

Figure 6:
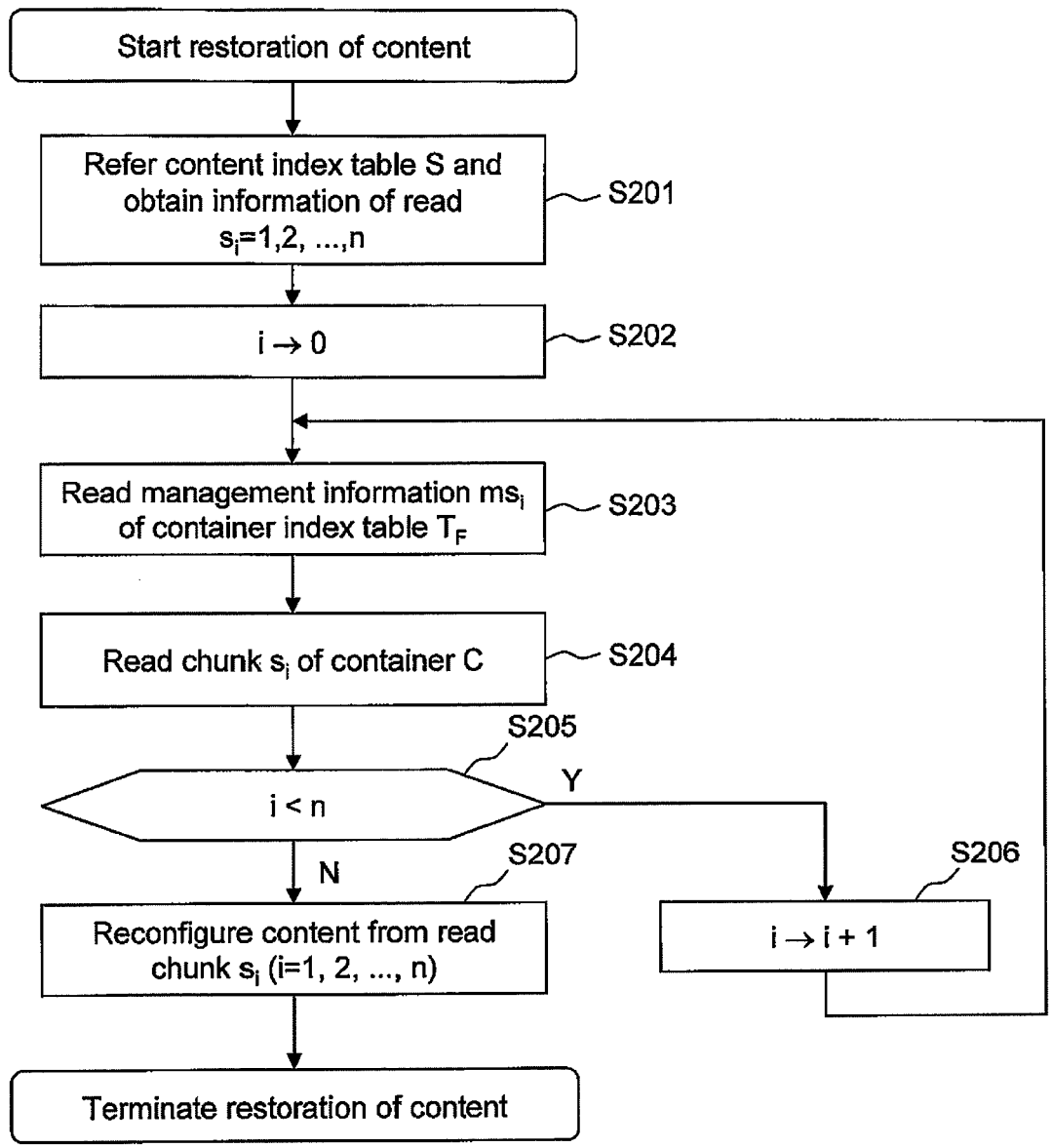
FIG. 6 is a flowchart showing processing steps of restoration processing according to the first example.

FIG. 6 shows details of restoration processing operations executed by the restoration program 152. First, the restoration program 152 refers to the content index table "S" (164) and obtains information of a chunk $s_i$ ($s_i$=1, 2, ..., n) included in content of the reading target (step S201). To be more specific, the restoration program 152 crates a list of the chunk $s_i$ that needs to be read from the content index table 164.

Next, the restoration program 152 sets "0" to the counter "i" (step S202). After that, the restoration program 152 reads management information $ms_i$ of the container index table $T_F$ (114) (step S203). To be more specific, according to the information of the chunk s, of the content index table 164 obtained in step S201, the restoration program 152 reads the container index table 114 to which the chunk $s_i$ belongs, from the disk 106, and reads management information of this chunk. As described above, the chunk management information denotes information of, for example, a chunk finger print, position in the container or chunk length.

Next, the restoration program 152 reads the chunk $s_i$ stored in, for example, the container 132 associated with the container index table 114, based on the management information $ms_i$ of the chunk read in step S203 (step S204).

Next, the restoration program 152 decides whether the reading of all chunks included in the restoration target content is finished (step S205). To be more specific, the restoration program 152 compares the chunk number "n" included in the content and the counter number in the counter "i."

In step S205, if it is decided that the reading of all chunks is finished, the restoration program 152 reconfigures the content based on the read chunk $s_i$ (i=1, 2, ..., n) and terminates the restoration processing (step S207). To be more specific, the restoration program 152 reconfigures the content with the read chunk $s_i$ based on offset information and chunk length information described in the content index table 164. By contrast, in step S205, if it is decided that the reading of all chunks is not finished, the restoration program 152 adds "1" to the counter "i" and returns to step S203 (step S206).

(1-4) Configuration of Universal Container (1-4-1) Definition of Universal Chunk Next, a configuration method of the universal container Cc (138) according to the present example will be explained. The universal container 138 is configured as an aggregation of universal chunks. The universal chunk denotes a chunk that is necessarily provided every content type and is not necessarily accessed many times. Therefore, if access is performed one time every content, a chunk that is necessarily accessed is a universal chunk.

(1-4-2) Concept of Specifying Processing of Universal Chunk

The backup program 150 specifies a universal chunk using the measurement table "R" (160). FIG. 7 shows a specific configuration of the measurement table 160. The measurement table 160 is configured with a message digest 300, a reference bit 302 and an "ni" bit 310. The message digest 300 is used to specify a processing target. The reference bit 302 is updated to "0" at the time of initialization and updated to "1" when the registered message digest 300 is referred. The "ni" bit 310 shows whether it is an initial registration. The "ni" bit 310 is initialized to "0" and updated to "1" when it is not an initial registration.

In the following, a case will be explained where the contents $f_1$ (260), $f_2$ (270) and $f_3$ (280) are backed up. The measurement table 160 shown in FIG. 7(1) shows a state of the measurement table 160 after the backup program 150 backups the content $f_1$ (260). As described above, the content $f_1$ is configured with the chunks "a" and "f." Here, the FP (Finger Print) values of the chunks are registered in the message digest 300. It should be noted that, since the "ni" bit 310 is "0," all chunks forming the content $f_1$ are registered in the measurement table 160. The backup program 150 updates the "ni" bit to "1" at the timing the content $f_1$ has been backed up.

Next, the backup program 150 backups the content $f_2$ (270). In this case, the "ni" bit is set to "1". Therefore, when the content $f_2$ includes a duplication chunk, the backup program 150 updates the reference bit 302 corresponding to the duplication chunk to "1." The measurement table 160 shown in FIG. 7(2) shows a state of the measurement table 160 at the timing the content $f_2$ is backed up. In this case, the content $f_2$ is configured with the chunks "b," "c" and "f." Therefore, only the reference bit of an FP value FPf corresponding to the chunk "f" is updated to "1."

Next, the backup program 150 deletes a message digest with the reference bit 302 of "0" at the timing the content $f_2$ has been backed up. Then, if there is a registration remaining in the measurement table 160, its reference bit is updated to "0." The backup program 150 repeats similar processing for the content $f_3$. The measurement table 160 shown in FIG. 7(3) shows a state of the measurement table 160 after the content $f_3$ is backed up. At this time, data registered in the measurement table 160 is the chunk "f." In this case, the backup program 150 decides that the chunk "f" is a universal chunk.

(1-4-3) Details of Universal Chunk Specifying Processing

Figure 8:
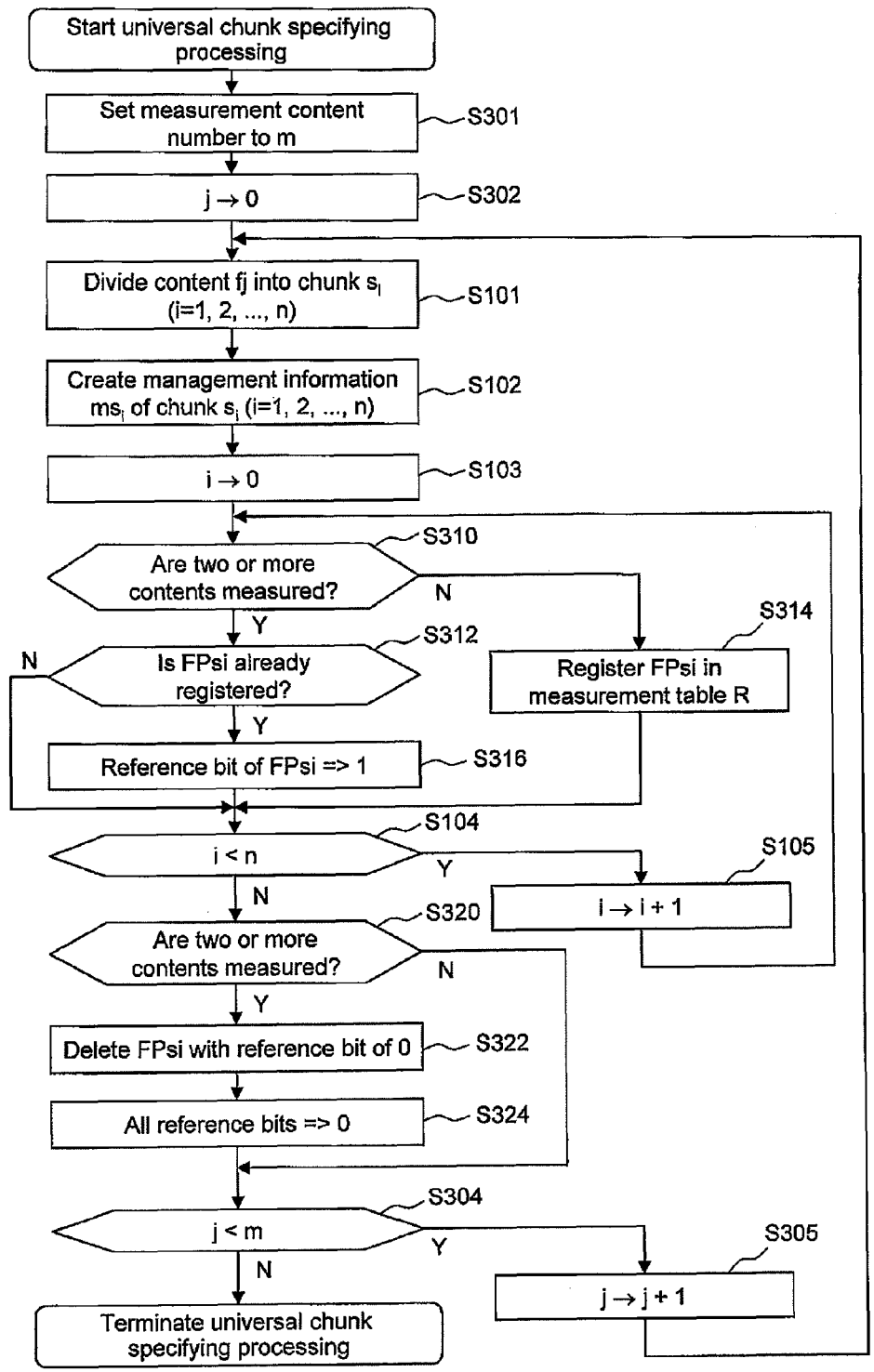
FIG. 8 is a flowchart showing specifying processing steps for universal chunk according to the first example.

FIG. 8 shows details of universal chunk specifying processing executed by the backup program 150. It should be noted that, in the case of the present example, universal chunk specifying processing is executed before essential backup processing (i.e. operation start of the storage device).

First, the backup program 150 sets a measured content number to "m" (step S301) and initializes a variable number "j" to "0" (step S302).

Next, the backup program 150 executes the similar processing to steps S101, S102 and S103 in FIG. 5, and creates the management information $ms_i$ of the chunk $s_i$ forming content $f_j$. After that, the backup program 150 refers to the "ni" bit 310 in the measurement table 160 (in FIG. 7) and decides whether two or more contents are measured (step S310).

If it is decided that the first content is measured (i.e. in the case of a negative result in step S310), the backup program 150 executes processing in step S314. In step S314, the backup program 150 registers an FP value $FP_{si}$ of the chunk $s_i$ in the measurement table 160. After that, the backup program 150 executes processing in step S104.

By contrast, in step S310, if it is decided that two or more contents are measured, the backup program 150 executes processing in step S312. In step S312, the backup program 150 decides whether the FP value $FP_{si}$ of the chunk $s_i$ is already registered in the measurement table 160. In a case where the FP value $FP_{si}$ is already registered, the backup program 150 executes step S316. By contrast, in a case where the FP value $FP_{si}$ is not already registered, the backup program 150 executes processing in step S104. In step S316, the backup program 150 updates the reference bit 302 of the FP value $FP_{si}$ to "1." After that, the backup program 150 executes processing in step S104.

In step S104, the backup program 150 decides whether processing is terminated for all chunks of the content $f_j$ (step S104). To be more specific, the backup program 150 compares the variable number "i" and the chunk number "n." When the variable number "i" is less than the chunk number "n," the backup program 150 adds "1" to the variable number "i" and returns to step S310 (step S105). By contrast, if the "i"

is equal to or greater than "n," the backup program 150 executes processing in step S320.

In step S320, the backup program 150 refers to the "ni" bit 310 in the measurement table 160 (in FIG. 7) and decides whether two or more contents are measured. If it is decided that two or more contents are measured, the backup program 150 executes processing in step S322. By contrast, if it is decided that the first content is measured, the backup program 150 executes processing in step S304.

In step S322, the backup program 150 deletes the message digest 300 with the reference bit 302 of "0," from the measurement table 160. By this processing, chunk information that is not referred in the measurement of the content $f_j$ is deleted from the measurement table 160. After that, the backup program 150 sets "0" to all the reference bits of data remaining in the measurement table 160 and is ready for the next measurement (step S324).

After that, the backup program 150 compares the variable number "j" and the content number "m" (step S304). If the variable number "j" is less than the content number "m," the backup program 150 adds "1" to the variable number "j" and returns to step S101 (step S305). By contrast, if the variable number "j" is equal to or greater than "m," the backup program 150 terminates processing.

By the way in the cases of FIGS. 7 and 8, the backup program 150 executes universal chunk specifying processing using the FP (Finger Print) value of the chunk $s_j$. However, in universal chunk specifying, it may be possible to use a hash value derived from a rolling hash system, instead of the FP (Finger Print) value. For example, as disclosed in NPL 2 and NPL 3, the rolling hash system denotes a system of calculating a hash value of a data sequence within a determined window width at high speed. To be more specific, after a hash value of a given window width is calculated, the window is shifted and a hash value of a data sequence within the window is calculated using the hash value before the shift.

(1-4-4) Details of Creation Processing of Universal Container and Universal Container Index Table The above-described universal chunk specifying processing is performed using the backup program 150 before the content backup starts. Also, the backup program 150 creates the universal container Cc (138) and the universal container index table Tc (128) using the message digest 300 of the measurement table 160. It should be noted that the universal container 138 and the universal container index table 128 are created with reference to a container and container index table created according to universal chunk specifying processing. After the universal container 138 and the universal container index table 128 are created, a chunk index table, the container and the container index table created according to the universal chunk specifying processing are all deleted.

This universal chunk specifying processing is designated through, for example, a command that is made in response to an operator's operation input for the manager terminal device 172. In a case where the command or the like from the manager terminal device 172 is not used for the destination, it may be possible to store in advance instruction content in an initialized file or the like as an initial value, and read and use it at the time of activation of the backup program 150.

The universal container index table 128 is expanded and held on the memory 104 at the time of activation of the backup program 150. Also, the universal container 138 may be expanded and held on the memory 104 at the time of activation of the backup program 150. At the time of deactivation of the program, the backup program 150 terminates the universal container index table 128 expanded on the memory. If the universal container 138 is expanded on the memory too, the backup program 150 terminates the universal container 138 at the time of deactivation of the program.

(1-5) Effects of the Present Example

As described above, the storage device 100 according to the present example provides the universal container 138 and the universal container index table 128 to manage universal chunks collectively. By providing the container and its index table for universal chunks, unlike the conventional method, a container to which universal chunks belong is not managed including other chunks than the universal chunks. Consequently, at the time of backup processing, it is possible to expand the universal container index table 128 aggregating only management information related to universal chunks, on the memory 104, and use it to decide whether a chunk to be stored is a universal chunk.

On the other hand, in the case of the conventional method, it is necessary to expand a container index table that manages other chunks that are hardly referred than universal chunks, on a memory. Therefore, information that is hardly referred is expanded many times on the memory.

The storage device 100 according to the present example expands, on a memory 104, a universal container index table including only universal chunks that are necessarily referred even at low access frequency, when detecting whether the chunk extracted from the content is a duplication chunk, so that it is possible to realize an efficient use of the memory 104.

Also, even in restoration, universal chunks are collectively stored in a universal container, so that it is possible to reduce the input/output number in reading the universal chunks from the disk 106 into the memory 104 compared to the conventional method, and realize an efficient use of the memory 104.

In view of the above results, it is possible to improve the backup performance and restoration performance of the storage device 100 compared to the conventional method.

(2) Second Example

(2-1) Outline of Deduplication Function Mounted on Storage Device

First, an outline of a deduplication function according to the present example will be explained. In the first example, a case has been described where the backup program 150 is used to create the universal container Cc (138) before the start of backup of the content and not perform universal chunk specifying processing after the storage device 100 starts an operation of backup processing.

However, in the case of a storage device according to the present example, it is possible to perform universal chunk specifying processing even after the start of operations and additionally register a specified universal chunk in a universal container.

The backup program 150 according to the present example starts universal chunk specifying processing similar to that in FIG. 8, at the timing of arrival of backup target content. Specifying processing by the backup program 150 is terminated when the backup for each generation is terminated, and a universal chunk specified in the measurement table 160 is registered in the universal container Cc (138). Next, the backup program 150 writes the universal container 138 in the disk 106 and performs processing such that universal chunk data that is additionally registered in a universal container is reflected to the next backup processing.

Figure 9:
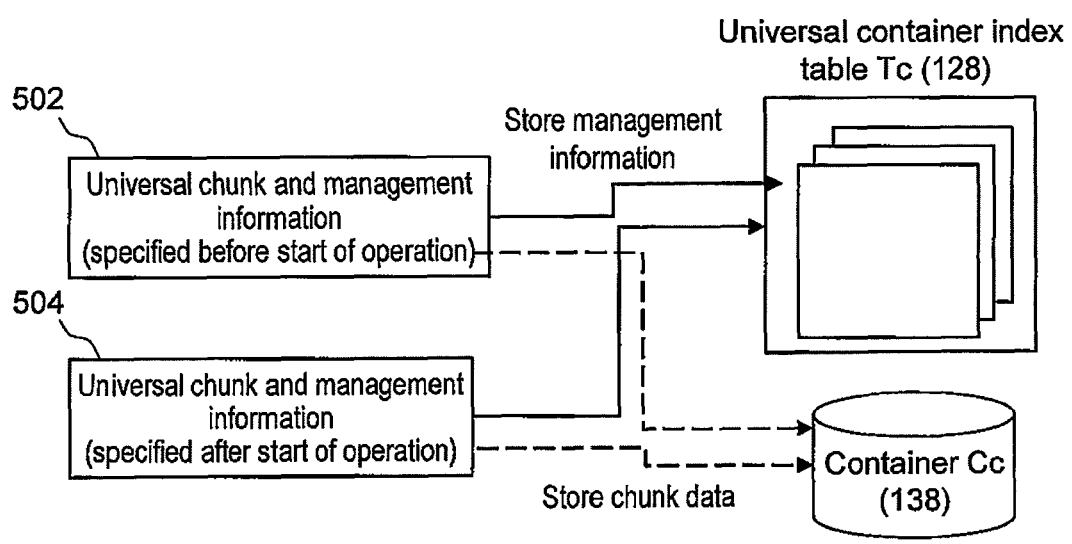
FIG. 9 conceptually illustrates a storage method of universal chunks and management information according to a second example.

FIG. 9 shows a registration image of a universal container and its index table according to the present example. As shown in FIG. 9, a pair 502 of a universal chunk specified before the start of operations and its management information, and a pair 504 of a universal chunk specified after the start of operations and its management information, are stored in the same universal container index table 128 and the universal container 138.

(2-2) Configuration of Storage Device

The function configuration of the storage device 100 according to the present example is the same as in the first example, except for an additional function provided in the backup program 150. Therefore, detailed explanation will be omitted.

(2-3) Backup Processing and Restoration Processing

Backup processing and restoration processing according to the present example are substantially the same as in the first example. Therefore, detailed explanation will be omitted.

(2-4) Configuration of Universal Container

A configuration of a universal container before the start of backup processing according to the present example is the same as in the first example. Therefore, detailed explanation will be omitted.

(2-5) Registration and Deletion of Universal Chunk During Backup Processing

Here, in a case where a universal chunk is specified after the start of backup processing, processing steps for additionally registering the specified universal chunk in a universal container will be explained.

In the case of the present example, the backup program 150 starts universal chunk specifying processing at the same time of the start of backup processing. When processing target content has been backed up and a new backup generation is created, the backup program 150 searches the container index table "T" (110) based on data registered in the measurement table 160 and additionally registers management information of the search result in the universal container index table Tc (118). That is, the backup program 150 registers a copy of management information of the specified universal chunk in the universal container Cc (138).

When it is expected to improve restoration performance, it may be possible to add chunk data as is in the universal container 138 and creates its copy. However, this method causes duplication of chunk data. Further, chunk data to be additionally registered is already registered in other containers than the universal container, and therefore is not necessarily registered in the universal container 138.

For example, the backup program 150 executes the following processing operations. When forwarding a backup generation after the start of new backup, the backup program 150 copies the measurement table 160 and starts new universal chunk specifying processing. After the universal chunk specifying processing is completed, the backup program 150 compares the result with the copied previous-generation measurement table 160 and deletes, from the universal container index table 118, universal chunk information that is present in the previous-generation measurement table 160 but is not present in the current measurement table 160. If the chunk data is registered in the universal container 138 too, the backup program 150 deletes the chunk data in the same way.

(2-6) Effect of the Present Example

As described above, the present example applies universal chunk specifying processing after the start of backup operations, so that it is possible to specify a new universal chunk every time a backup generation proceeds. Further, in the present example, an unused universal chunk is deleted to avoid an infinite increase of universal containers and universal container index tables. By this means, it is possible to operate universal containers and universal container index tables in response to a backup generation change.

(3) Third Example (3-1) Outline of Deduplication Function Mounted on Storage Device First, an outline of a deduplication function according to the present example will be explained. In the storage device according to the second example, the backup program 150 creates the universal container 138 before the start of operations and further executes universal chunk specifying processing even after the start of operations. Then, the backup program 150 according to the second example additionally registers a universal chunk that is newly specified in a universal container while deleting an unused universal chunk from the universal container. Thus, in the case of the second example, a universal chunk that is created and registered in advance may be deleted later from the universal container. However, database normally involves fragmentation by repeating record registration and deletion, which degrades the record search performance and registration performance.

Therefore, a storage device according to the present example adopts a method of managing a universal container index table created in advance (hereinafter referred to as "static universal container index table") and a universal container index table in which a universal chunk to be newly specified after the start of operations is registered (hereinafter referred to as "dynamic universal container index table") as respective tables. It should be noted that, after the start of operations, the storage device according to the present example allows only reading processing to the static universal container index table and limits a performance degradation portion due to fragmentation only within the dynamic universal container index table.

In the present example, at the time of program activation, the backup program 150 expands the static universal container index table and the dynamic universal container index table on the memory 104 and starts universal chunk specifying processing at the time of arrival of backup target content.

Universal chunk specifying processing by the backup program 150 is terminated when the backup for each generation is terminated, and a universal chunk that is newly specified in the measurement table 160 is registered in the dynamic universal container. Next, the backup program 150 performs processing such that the dynamic universal container is written in the disk 106 and universal chunk data that is additionally registered in the dynamic universal container is reflected to the next backup processing.

Figure 10:
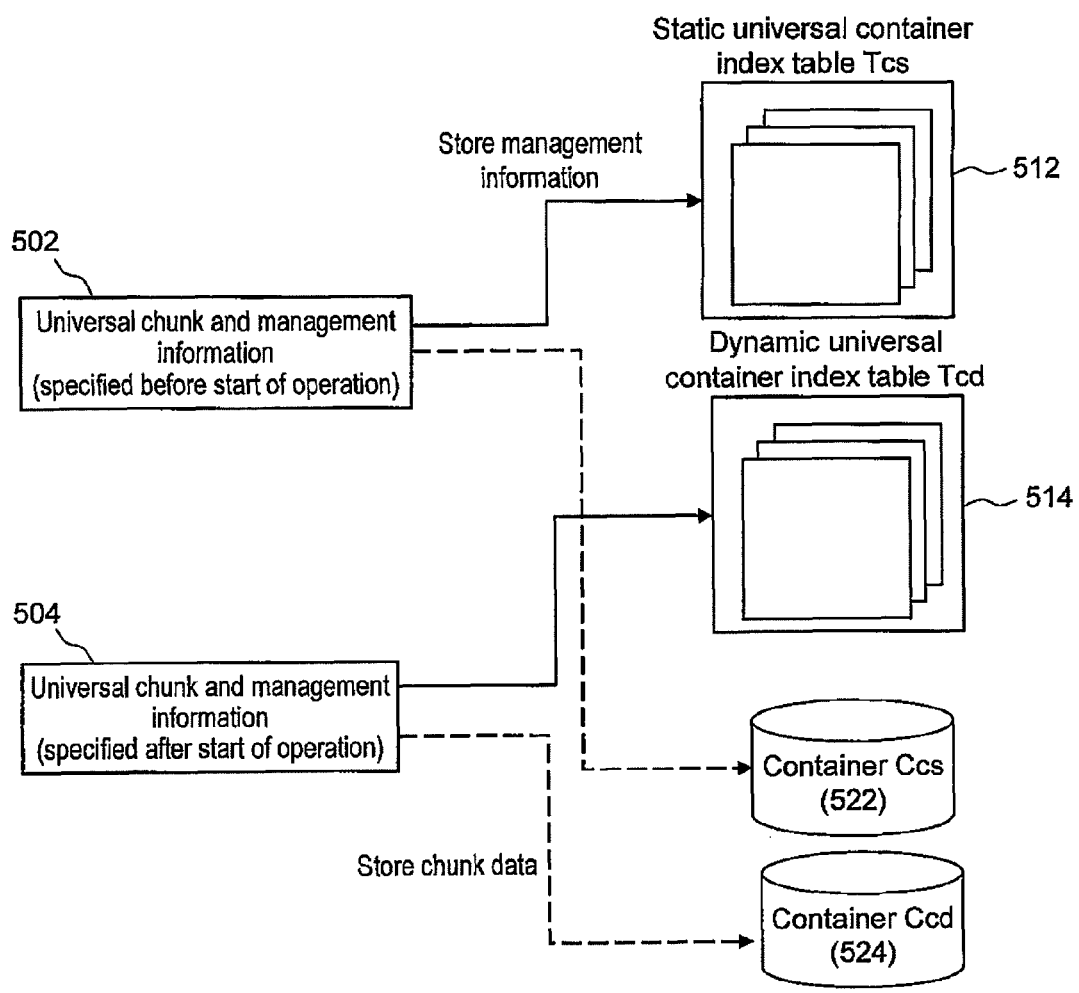
FIG. 10 conceptually illustrates a storage method of universal chunks and management information according to a third example.

FIG. 10 shows a registration image of universal containers and their index tables according to the present example. As shown in FIG. 10, the pair 502 of a universal chunk specified before the start of operations and its management information is stored in a static universal container index table 512 and a static universal container 522, and the pair 504 of a universal chunk specified after the start of operations and its management information is stored in a dynamic universal container index table 514 and a dynamic universal container 524.

(3-2) Configuration of Storage Device

The functional configuration of the storage device 100 according to the present example is substantially the same as in the first example, except for an additional function provided in the backup program 150. Therefore, detailed explanation will be omitted.

(3-3) Backup Processing and Restoration Processing

Backup processing and restoration processing according to the present example are substantially the same as in the first example. Therefore, detailed explanation will be omitted.

(3-4) Configuration of Universal Container

In the case of the present example, a configuration of a universal container before the start of backup processing is the same as in the second example. Therefore, detailed explanation of a universal container configuration before the start of backup processing will be omitted.

(3-5) Registration and Deletion of Universal Chunk During Backup Processing

Here, in a case where a universal chunk is newly specified after the start of backup processing, processing steps for additionally registering the specified universal chunk in a universal container will be explained.

In the case of the present example, the backup program 150 starts universal chunk specifying processing at the same time of the start of backup processing. When processing target content has been backed up and a new backup generation is created, the backup program 150 searches a container index table based on data registered in the measurement table 160 and additionally registers management information of the search result in the dynamic universal container index table 514. That is, the backup program 150 registers a copy of management information of the specified universal chunk in the dynamic universal container index table 514. When it is expected to improve restoration performance, it may be possible to add chunk data as is in the dynamic universal container 524 and creates its copy. However, this method causes duplication of chunk data. Further, chunk data itself to be additionally registered is already registered in other containers than the universal container, and therefore is not necessarily registered in the dynamic universal container 524.

For example, the backup program 150 executes the following processing operations. When forwarding a backup generation after the start of new backup, the backup program 150 copies the measurement table 160 and starts new universal chunk specifying processing. After the universal chunk specifying processing is completed, the backup program 150 compares the result with the copied previous-generation measurement table 160 and deletes, from the dynamic universal container index table 514, dynamic universal chunk information that is present in the previous-generation measurement table 160 but is not present in the current measurement table 160. If the chunk data is registered in the dynamic universal container too, the backup program 150 deletes the chunk data in the same way.

Further, if all data is not present because of the deletion, the backup program 150 executes initialization of the dynamic universal container index table 514. The initialization may utilize an initialization function held in database or delete the existing dynamic universal container index table 514 to create a new dynamic universal container index table 514. By this processing, it is possible to avoid performance degradation due to fragmentation caused in the database.

(3-6) Effect of the Present Example

As described above, the present example applies universal chunk specifying processing after the start of backup operations, registers a universal chunk that is newly specified every time a backup generation proceeds, in the dynamic universal container 524, and deletes an unused universal chunk from the dynamic universal container index table 514. By this means, it is possible to avoid deletion of registration data in the static universal container 522 and avoid performance degradation due to fragmentation of database.

(4) Fourth Example

(4-1) Outline of Deduplication Function Mounted on Storage Device

First, an outline of a deduplication function according to the present example will be explained. In the above-described first, second and third examples, the backup program 150 specifies a universal chunk every backup generation. Normally, a universal chunk depends on a file format and is present every content type.

In a case where a content to be backed up includes a plurality of content types, even if universal chunk specifying processing is performed every backup generation, it is not possible to specify the universal chunk for each content type but it is possible to specify only a universal chunk that is common in the plurality of content types. That is, similar to other chunks, the universal chunk for each content type is registered in a normal container.

For example, in a case where: contents of a content type A are backed up in a given backup generation; the contents of the content type A are not backed up in the following one or multiple backup generations; and the contents of the content type A are backed up in a subsequent backup generation, the above-mentioned situation arises.

Therefore, upon referring a universal chunk that is necessarily provided every content type, it is necessary to expand a container index table including management information of other data that is hardly referred, and its corresponding container on a memory. In this case, the reading and writing of less essential data occur many times and the less essential data consumes memory resources. This leads to degradation in backup performance and restoration performance.

Therefore, the present example employs a method of specifying the universal chunk for each content type. Consequently, when creating a static universal container, the backup program 150 according to the present example creates the measurement table 160 for each content type and specifies universal chunks. Further, the backup program 150 registers the specified universal chunk in the static universal container and creates a static universal container index table.

At the time of activation, the backup program 150 expands a static universal container index table and a dynamic universal container index table on the memory 104, and, when a backup target content arrives, starts universal chunk specifying processing every content type. The universal chunk specifying processing according to the present example is terminated when the backup for each generation is completed, and universal chunks specified in the measurement table 160 are registered in the dynamic universal container. Next, the backup program 150 performs processing such that the dynamic universal container is written in the disk 106 and universal chunk data that is additionally registered in the dynamic universal container is reflected to the next backup processing.

Figure 11:
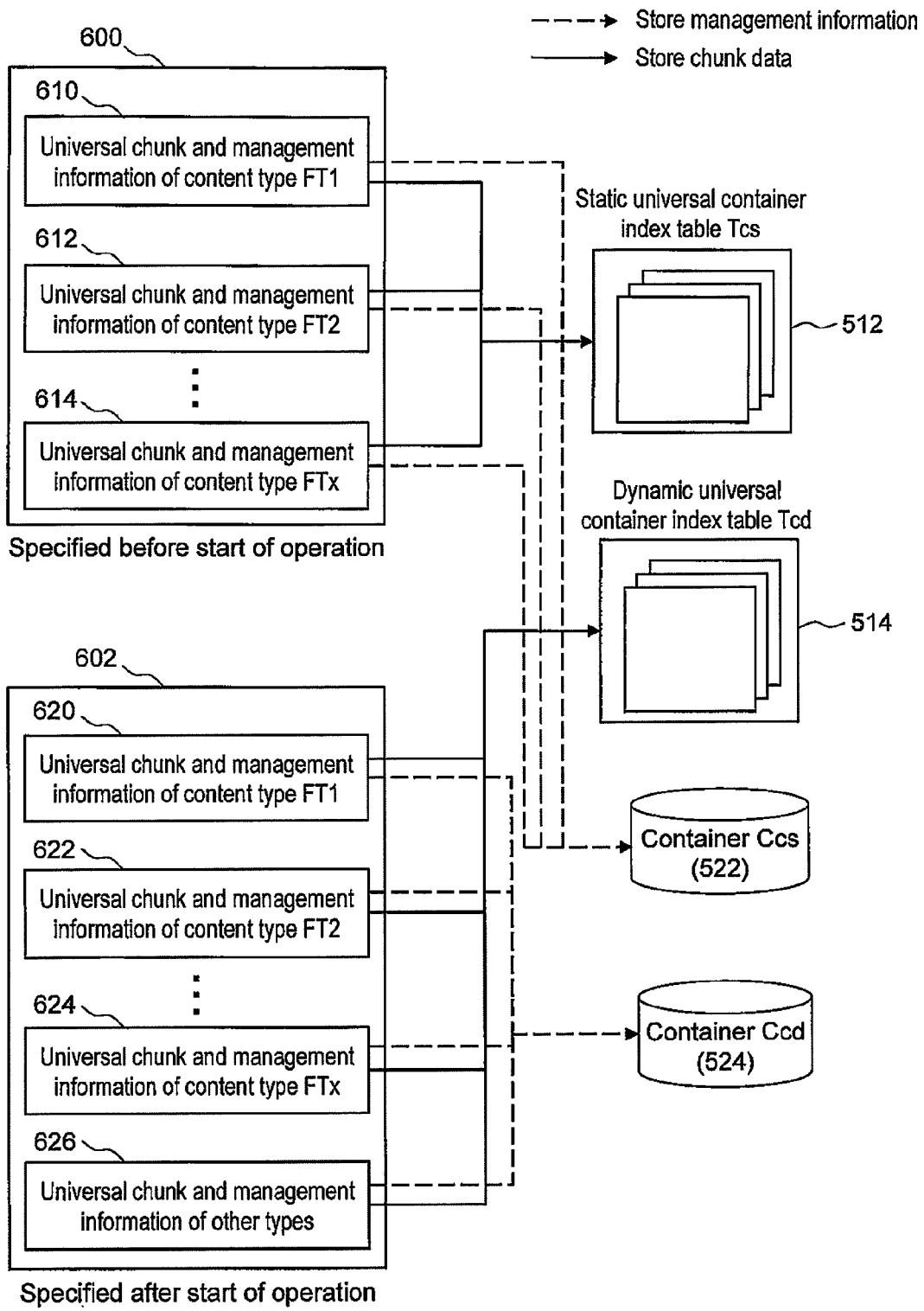
FIG. 11 conceptually illustrates a storage method of universal chunks and management information according to a fourth example.

FIG. 11 shows a registration image of universal chunks and management information according to the present example. In the case of FIG. 11, pairs 600 of universal chunks and their management information specified before the start of operations, are configured with content-type pairs 610, 612 and 614. Management information generated for each content type is stored in the static universal container index table 512, and universal chunks specified for each content type are stored in the static universal container 522. Pairs 602 of universal chunks and their management information specified after the start of operations, are configured with content-type pairs 620, 622, 624 and 626. It should be noted that, regarding one or multiple content types processed for the first time after the start of operations, these are processed as one group, that is, as a pair 626 of their common universal chunk and management information. The management information generated for each content type is stored in the dynamic universe container index table 514, and the universal chunk specified for each content type is stored in the dynamic universal container 524.

(4-2) Configuration of Storage Device

The functional configuration of the storage device 100 according to the present example is substantially the same as in the first example, except for an additional function provided in the backup program 150. Therefore, detailed explanation will be omitted.

(4-3) Backup Processing and Restoration Processing

Backup processing and restoration processing according to the present example are substantially the same as in the first example. Therefore, detailed explanation will be omitted.

(4-4) Configuration of Universal Container

In a case before the start of backup processing, the present example is similar to the above-described examples, except for that the measurement table 160 for each content type is prepared to specify a universal chunk and register the specified universal chunk in a static universal container. Also, in a case during the start of backup processing, the present example is similar to the above-described examples, except for that the measurement table 160 for each content type is used to specify a universal chunk and register the specified universal chunk in a dynamic universal container.

As shown in FIG. 11, in the case of the present example, a static universal container, a dynamic universal container and their index tables for each content type are stored in the disk 106. The static universal container 522 supporting each content type is expanded on the memory 104 at the time of activation of the backup program 150. At this time, the backup program 150 can newly register the static universal container 522 prepared for each content type, in an aggregation form in one static universal container and its index table. Naturally, the backup program 150 may expand them on a memory as independent static containers and their index tables. Also, dynamic universal containers and their index tables may be configured for each content type or configured in an aggregation form.

(4-5) Processing of Specifying Universal Chunk for Each Content Type

Figure 12:
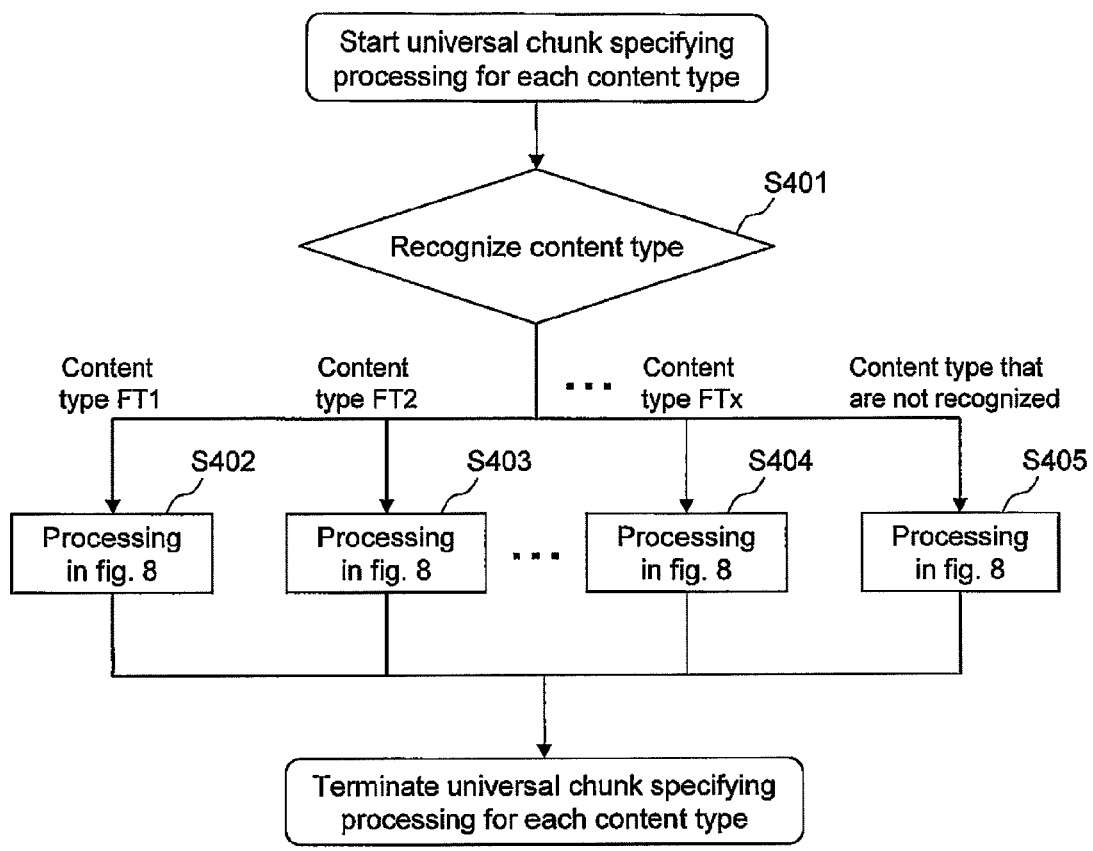
FIG. 12 is a flowchart showing specifying processing steps for universal chunk according to the fourth example.

FIG. 12 shows processing steps of specifying a universal chunk for each content type. First, the backup program 150 recognizes the content type of each backup target content (step S401). This content type can be recognized by a magic number or extension stored in the content header. It should be noted that the content types that are not recognized are processed as one group.

After the content type recognition, the backup program 150 executes the processing (in steps S402, S403, S404 and S405) shown in FIG. 8 for each content type. That is, the universal chunk for each content type is specified.

(4-6) Advantage of the Present Example

As described above, the present example applies universal chunk specifying processing to each content type. Consequently, even in a case where a plurality of content types are present in a backup content, it is possible to specify the universal chunk for each content type and manage it as the universal container and its index table. Therefore, at the time of execution of backup or restoration, it is possible to expand, on a memory, only a universal container storing only a universal chunk that is necessarily provided in a backup target content, and its index table. That is, it is possible to avoid the possibility that a container index table and container that are hardly referred except for the time universal chunks are referred, are expanded on the memory. As a result of this, it is possible to improve backup performance and restoration performance.

(5) Fifth Example (5-1) Outline of Deduplication Function Mounted on Storage Device First, an outline of a deduplication function according to the present example will be explained. In the above-mentioned fourth example, a case has been described where the backup program 150 statically and dynamically executes universal chunk specifying processing for each content type. However, there are many content types.

Therefore, a large processing load is required for universal chunk specifying processing for all content types. Also, the measurement table 160 is required by the number of content types, which consumes a memory region. Also, in practice, it is essential to configure a static universal container, a dynamic universal container and their index tables only for a file format used for each backup system, and it is not necessary to register universal chunks individually for all file formats. Actually, if static universal containers, dynamic universal containers and their index tables for all file formats are registered, a universal chunk of less use frequency is registered and therefore resources are wasted.

Therefore, in the present example, it is possible to configure a static universal container, a dynamic universal container and their index tables only for a content type that is actually used. To be more specific, a system is adopted where an operator designates in advance a content type for which a universal container and its index table are created before a static universal container is created. After the selection, the measurement table 160 is created only for the selected content type and universal chunk specifying processing is executed only for the corresponding content type. The backup program 150 registers the specified universal chunk in the static universal container and creates a static universal container index table to store the management information.

After the start of operations, the backup program 150 expands the static universal container index table and the dynamic universal container index table on the memory 104 at the time of activation and, every time a backup target content arrives, starts universal chunk specifying processing for the selected content type. Universal chunk specifying processing is terminated when the backup for each generation is terminated. The backup program 150 registers a universal chunk specified using the measurement table 160, in the dynamic universal container. Next, the backup program 150 performs processing such that the dynamic universal container is written in the disk 106 and universal chunk data that is additionally registered in the dynamic universal container is reflected to the next backup processing.

A content type to be used is selected and designated through an operator's operation input in the manager terminal device 172. The manager terminal device 172 issues an instruction (such as a command) in response to the operation input, to the backup program 150. However, a case is possible where the instruction for the backup program 150 is not designated from the manager terminal device 172. In this case, it may be possible to store in advance the corresponding instruction in an initialized file or the like as an initial value, and read and use the initial value at the time of activation of the backup program 150.

FIG. 13 shows a configuration example of a type selection screen 700 displayed on an operation screen of the manager terminal device 172. FIG. 13(A) shows a screen configuration example before a content type is selected. The selection screen 700 is configured with a list field 702 of selectable content types, a selected content type field 704, a button 710 to reflect a content type selected in the list field 702 to the selected content type field 704, and a registration button 712 to reflect the selected content type in the selected content type field 704 to a backup system.

FIG. 13(B) shows a screen example for explaining a screen configuration after a content type is selected. FIG. 13(B) shows a screen where a content type FT2 is selected from four content types shown in the list field and the button 710 is subjected to a click operation. A hatching display 720 of the list field 702 shows that the content type FT2 is in a selection state. The selection state is displayed by a different color from that before selection, for example. The button 710 has been operated, and therefore the selected content type field 704 shows a name 722 of the selected content type.

Figure 14:
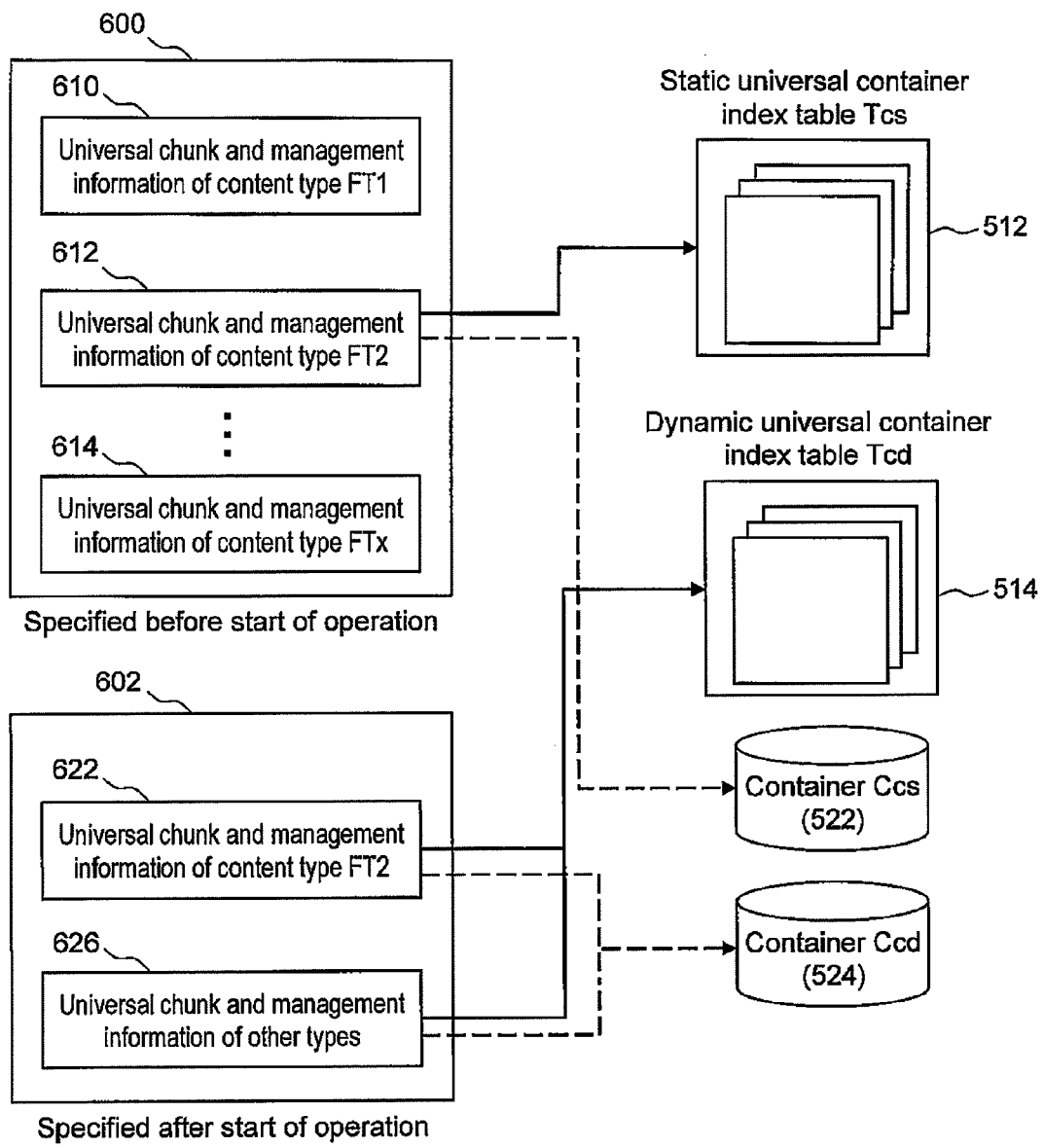
FIG. 14 conceptually illustrates a storage method of universal chunks and management information according to the fifth example.

FIG. 14 shows a registration image of universal containers and their index tables according to the present example. FIG. 14 shows a state where, among the pairs 600 of universal chunks and their management information specified (or specifiable) before the start of operations, only the content type selected in the operation screen shown in FIG. 13(B) is stored in the static universal container 522 and the static universal container index table 512.

FIG. 14 shows a pair 610 associated with the content type FT1, a pair 612 associated with the content type FT2, and a pair 614 associated with the content type FTx, as the pairs 600 of universal chunks and their management information. Also, a static universal container associated with the selected content type FT2 is stored in the static universal container 522 and corresponding management information is registered in the static universal container index table 512.

In the case of the present example, universal chunk specifying processing after the start of operations, is executed for a selected content type and other content types. In the case of FIG. 13(B), the number of selected content types is one. Therefore, in FIG. 14, the pairs 602 of universal chunks and their management information specified after the start of operations provide two kinds of the pair 622 associated with the content type FT 2 and the pair 626 associated with other content types. In this case, the universal chunks specified for these two content types are stored in the dynamic universal container 524 and their management information is registered in the dynamic universal container index table 514.

(5-2) Configuration of Storage Device

The functional configuration of the storage device 100 according to the present example is substantially the same as in the first example, except for an additional function provided in the backup program 150. Therefore, detailed explanation will be omitted.

(5-3) Backup Processing and Restoration Processing

Backup processing and restoration processing according to the present example are substantially the same as in the first example. Therefore, detailed explanation will be omitted.

(5-4) Configuration of Universal Container

In a case before the start of backup processing, the present example is similar to the fourth example, except for that the measurement table 160 for each content type is prepared to specify a universal chunk and register the specified universal chunk in a static universal container.

Similarly, in a case during the start of backup processing, the present example is similar to the above-described examples, except for that the measurement tables 160 for a selected content type and other content types are used to specify universal chunks and register the specified universal chunks in a dynamic universal container.

Also, in the case of the present example, a static universal container, a dynamic universal container and their index tables for each content type are stored in the disk 106. The static universal container 522 supporting selected content types is expanded on the memory 104 at the time of activation of the backup program 150. At this time, it is possible to newly register static universal containers and their index tables associated with the selected content types, in an aggregation form in one static universal container and its index table. Naturally, the backup program 150 may expand them on a memory as independent static containers and their index tables. Also, dynamic universal containers and their index tables may be configured for each selected content type or configured in an aggregation form.

(5-5) Advantage of the Present Example

As described above, the present example applies universal chunk specifying processing only to a designated content type. Therefore, for possible or all present content types, it is possible to suppress a processing load compared to a case where universal chunk specifying processing is individually performed. Also, in the case of the present example, it is not necessary to individually prepare the measurement table 160 for possible or all present content types. Therefore, compared to a case where a content type is not selected, it is possible to suppress the memory consumption to the minimum. Also, in a case where universal chunks are registered for possible or all present file formats, static universal containers, dynamic universal containers, their index tables, universal chunks of less use frequency need to be registered, which wastes resources. However, in the case of the present example, by creating and managing a static universal container, a dynamic universal container and their index tables only for a selected content type, it is possible to improve backup performance and restoration performance.

(6) Other Examples

In the above-noted examples, cases have been described where the processor 102 is employed as a control unit to entirely control various processing functions. However, the present invention is not limited to this, and hardware or software to execute processing as a control unit may be prepared instead of the processor 102. In the case of employing such a configuration, it is equally possible to realize the same advantages as in the above-described examples.

Also, processing steps to realize the deduplication function according to each example need not be necessarily performed in time series along the order described in the flowchart. That is, the execution order of processing steps executed in the storage device 100 or the like may be different from those of the examples or executed in parallel.

Also, hardware configurations such as a CPU, ROM and RAM incorporated in the storage device 100 or the like may be realized through processing by computer programs having the same functions as above. Also, these compute programs may be distributed via a network or may be memorized in a memory medium and provided.

INDUSTRIAL APPLICABILITY

The present invention is widely applicable to a storage device employing a system of deduplicating and storing contents in chunk units.

REFERENCE SIGNS LIST 100 storage device
102 processor
104 memory
106 disk
108 network interface
110 container index table
112 container index table
114 container index table
118 universal container index table
138 universal container
142 write buffer
144 read cache
150 backup program
152 restoration program
154 operating system
160 measurement table
162 chunk index table
164 content index table

The invention claimed is:

1. A storage system used for content backup, comprising:
a plurality of storage devices configured to provide a plurality of containers for storing a plurality of contents of data in a unit of chunk, in which the plurality of contents including a first content corresponding to a first backup generation among multiple backup generations and a second content corresponding to a second backup generation among the multiple backup generations and each of the plurality of contents is divided into a plurality of chunks;
a memory configured to store first management information and second management information; and
a processor configured to perform backup process of the plurality of content in accordance with an order of the multiple backup generations, and to specify a first chunk among the plurality of chunks as a universal chunk that is commonly included in the plurality of contents over the multiple backup generations by the first management information and to provide a first container of the plurality of containers for storing the first chunk, in advance to the backup process; wherein, when the processor performs a backup process of the first content, the processor is configured to determine whether each of the plurality of chunks included in the first content matches the first chunk stored in the first container by the first management information,
wherein, when the processor performs the backup process of the first content, the processor is further configured to determine, for only each of the chunks that is decided not to match the first chunk, whether each of the chunks matches at least one of second chunks which is already stored in at least one of a plurality of second containers that is different from the first container, by the second management information, and
wherein, when the processor performs the backup process of the first content, the processor is further configured to determine, for only each of the chunks decided not to match the second chunks in at least one of the second containers, whether each of the chunks is a new chunk, and to store the new chunk in at least one of the second containers and update the second management information.

2. The storage system according to claim 1,
wherein the processor is configured to manage the second management information by a unit of respective container of the plurality of second containers, wherein, if the processor determines that the chunk is not a new chunk based on a portion of the second management information corresponding to a certain second container of the plurality of the second containers, the processor is further configured to refer a third management information which associates an identifiers of the plurality of chunks with location information of the plurality of chunks in the plurality of second containers.

3. The storage system according to claim 2,
wherein the third management information is a chunk index table.

4. The storage system according to claim 1,
wherein the processor is configured to manage the second management information by a unit of respective container of the plurality of second containers,
wherein, if the processor determines that the chunk is not a new chunk based on a portion of the second management information corresponding to a certain second container of the plurality of the second containers, the processor is further configured to determine whether each of the chunks matches the second chunks stored in at least one of the plurality of second containers by other portion of the second management information corresponding to other second containers;
wherein, when the processor performs the backup process of the first content, the processor is configured to conduct roll-in of the portion of the second management information from at least one of the storage devices to the memory, or to conduct roll-out of the portion of the second management information from the memory to at least one of the storage devices, based on access frequency to the portion of the second management information by the processor.

5. The storage system according to claim 4,
wherein the second management information is a set of container index tables each associates a subset of identifiers of the chunks stored in each of the second containers with corresponding offsets and lengths of the chunks.

6. The storage system according to claim 4,
wherein the first chunk is a chunk which is not highly accessed from the processor and commonly included in the plurality of contents over the multiple backup generations.

7. The storage system according to claim 1,
wherein the processor is configured to specify the first chunk both of before and after the backup process.

8. The storage system according to claim 7,
wherein the processor is configured to specify a third chunk that is different from the first chunk as the universal chunk and to store the third chunk in the first container, and to perform the backup process of the first content in parallel.

* * * * *